(12) United States Patent
Ogiso

(10) Patent No.: US 8,402,354 B2
(45) Date of Patent: Mar. 19, 2013

(54) SIGNAL PROCESSOR AND ERROR CORRECTION PROCESS

(75) Inventor: Takayuki Ogiso, Tokyo (JP)

(73) Assignee: Sony Corporation, Tokyo (JP)

( * ) Notice: Subject to any disclaimer, the term of this patent is extended or adjusted under 35 U.S.C. 154(b) by 401 days.

(21) Appl. No.: 12/763,746

(22) Filed: Apr. 20, 2010

(65) Prior Publication Data

US 2010/0275092 A1    Oct. 28, 2010

(30) Foreign Application Priority Data

Apr. 28, 2009 (JP) ............................... P2009-109625

(51) Int. Cl.
*G06F 11/00* (2006.01)

(52) U.S. Cl. ......................... 714/811; 375/289

(58) Field of Classification Search ................... 714/760, 714/811; 375/289
See application file for complete search history.

(56) References Cited

U.S. PATENT DOCUMENTS

| | | | |
|---|---|---|---|
| 3,439,330 A | | 4/1969 | Sipress, et al. |
| 4,363,123 A | * | 12/1982 | Grover ............................ 377/28 |
| 4,962,509 A | * | 10/1990 | Itoh ................................ 375/286 |
| 5,504,761 A | * | 4/1996 | Shinbashi et al. ............ 714/812 |
| 5,691,998 A | * | 11/1997 | Sheets ........................... 714/811 |
| 5,946,355 A | * | 8/1999 | Baker ............................ 375/286 |
| 2010/0287434 A1 | * | 11/2010 | Fukuda ......................... 714/746 |
| 2010/0296589 A1 | * | 11/2010 | Maeda .......................... 375/257 |

FOREIGN PATENT DOCUMENTS

| EP | 0411 526 A1 | 2/1991 |
|---|---|---|
| JP | 3-109843 | 5/1991 |

OTHER PUBLICATIONS

European Search Report issued Aug. 9, 2010, in Munich, in European Patent Application No. 10 15 8462.

* cited by examiner

*Primary Examiner* — Philip Guyton
(74) *Attorney, Agent, or Firm* — Finnegan, Henderson, Farabow, Garrett & Dunner, L.L.P.

(57) ABSTRACT

A signal processor, which includes: a signal receiving section for receiving signals encoded under a predetermined code rule; a rule violation detecting section for detecting code rule violation included in the signals received by the signal receiving section; an error range specifying section for specifying a range in which an error bit is included out of a bit string which constitutes the signals on the basis of a position of the code rule violation detected by the rule violation detecting section; and an error correcting section for correcting one error bit in the range specified by the error range specifying section so that the code rule violation detected by the rule violation detecting section is eliminated.

12 Claims, 13 Drawing Sheets

FIG. 10

| BEFORE CORRECTION | | | AFTER CORRECTION | |
|---|---|---|---|---|
| ERROR LEVEL VALUE | NRZ VALUE | S | CORRECTION LEVEL VALUE | NRZ VALUE |
| 3 | 1 | × | 2 | 0 |
| 2 | 0 | + | 1 | 1 |
| | | − | 3 | |
| 1 | 1 | × | 2 | 0 |
| −1 | 1 | × | −2 | 0 |
| −2 | 0 | + | −3 | 1 |
| | | − | −1 | |
| −3 | 1 | × | −2 | 0 |

(AMI STATE OF PREVIOUS BIT)
×: Don't care
+: S0+ or S1+
−: S0− or S1−

SIGNAL PROCESSOR AND ERROR CORRECTION PROCESS

BACKGROUND OF THE INVENTION

1. Field of the Invention

The present invention relates to a signal processor and an error correction process.

2. Description of the Related Art

Portable devices, such as mobile phones, have a user operation section and an information display section which are connected with a connecting section. The connecting section is often constituted by a movable member. Typical examples of such a movable member include a flip structure of a flip mobile phone. The recent mobile phones provide video viewing and image-capturing capabilities as well as calling and message services. The connecting section should move in a complex manner to satisfy user demands. For example, when viewing video on his/her movable phone, a user may wish to turn the display section to himself/herself and retract the operation section unnecessary to video viewing. It is therefore necessary to provide a structure of the connecting section to easily change angles and positions of the display section in accordance with the intended use of the mobile phone, i.e., as a normal telephone, as a digital camera or as a television receiver.

The connecting section disposed between the operation section and the display section has many signal lines and power lines wired therein. For example, several tens of wires are disposed in parallel in the display section. Reliability of wiring, however, is significantly impaired when a movable member adapted to move in a complicated manner as described above. In order to address such a problem, there has occurred a transition from such a parallel transmission system to a serial transmission system with a reduced number of signal lines. Similarly, such a technical transition has occurred in various electronic devices with complicated wiring as well as mobile phones. The serial transmission system is adopted also for the purpose of reducing electromagnetic interference (EMI).

In the serial transmission system, transmitted data is encoded in a predetermined coding scheme. Examples of the coding scheme include non-return-to-zero (NRZ) coding schemes, Manchester coding schemes and alternate mark inversion (AMI) coding schemes. Japanese Unexamined Patent Application Publication No. 3-109843 discloses a data transmission system using AMI coding, which is a representative scheme of bipolar coding. Japanese Unexamined Patent Application Publication No. 3-109843 also discloses a system of data clock reproduction in which data clock is represented and transmitted as a mean value of a signal level and reproduced at a receiver side on the basis of the signal level.

SUMMARY OF THE INVENTION

Signals encoded by NRZ coding schemes include a direct-current (DC) component. It is therefore difficult to transmit the NRZ coded signals together with DC components, such as power supply. Manchester encoded signals and AMI encoded signals include no DC component. These signals can be transmitted together with DC components, such as power supply. These Manchester encoded signals and AMI encoded signals, however, should include a phase-locked loop (PLL) circuit to reproduce signal data clock at a receiver side. Such a PLL circuit provided at the receiver side may increase electric current to be consumed. The Manchester encoded signals are transmitted at a clock rate twice a data rate since data is transmitted at a rising edge and trailing edge of the clock. Such a transmission system operates at a high clock rate and thus consumes a significantly increased amount of electric current.

In order to address these problems, a code including no DC component and eliminating the necessity of a PLL circuit for clock reproduction and a signal transmission system incorporating the same have been developed. In the developed system, input data having mutually different first and second bit values are transmitted in a coded manner. The first bit value is represented by a plurality of first amplitude values. The second bit value is represented by second amplitude values different from the first amplitude values. The data is encoded and transmitted so that no successive amplitude values are the same and that the polarity of the amplitude values is inverted for each period. The same system is applied to various bipolar codes, such as the AMI code and a partial response code, to provide high-speed data transmission.

The transmission system has been developed to employ a wired transmission path of relatively high transmission quality. Thus, with the transmission system described above, the number of transmission error bits for each frame or each block, when one frame is divided into a plurality of blocks, is significantly small. The transmission errors occur at a ratio of about one bit for each frame or each block in transmission of control signals and sensor signals. Such transmission errors may preferably be corrected. Convolutional codes may be adapted in an error correction process to provide highly efficient error correction. Convolutional code-based error correction is, however, too large-scale for error correction of transmission data in a transmission path of relatively high transmission quality. In addition, such an error correction process may increase a circuit size.

It is therefore desirable to provide a novel and improved signal processor and an error correction process which can correct errors of data transmitted via a transmission path of relatively high transmission quality using a relatively small-scales circuit configuration.

An embodiment of the invention is a signal processor, which includes: a signal receiving section for receiving signals encoded under a predetermined code rule; a rule violation detecting section for detecting code rule violation included in the signals received by the signal receiving section; an error range specifying section for specifying a range in which an error bit is included out of a bit string which constitutes the signals on the basis of a position of the code rule violation detected by the rule violation detecting section; and an error correcting section for correcting one error bit in the range specified by the error range specifying section so that the code rule violation detected by the rule violation detecting section is eliminated.

The error correcting section may include: a correction value determination section for determining a value of a correction bit which can eliminate the code rule violation detected by the rule violation detecting section for each bit in the range specified by the error range specifying section; an amplitude difference calculating section for calculating difference between an amplitude value of the signals corresponding to a value of the correction bit determined by the correction value determination section and an amplitude value of the signals corresponding to a previous bit of the correction bit; a maximum difference selecting section for comparing difference in the amplitude values corresponding to each of the bits in the range calculated by the amplitude difference calculating section and selecting a value of a correction bit with the maximum difference in the amplitude value; and a correction processing section for correcting an error using a value of the correction bit selected by the maximum difference selecting section.

The error correcting section may further include: an absolute value calculating section for calculating an absolute value of the value of the correction bit if there is a plurality of values of the correction bits selected by the maximum value selecting section; and a maximum absolute value selecting section for comparing the absolute values of the values of the correction bits calculated by the absolute value calculating section and selecting a value of the correction bit with the largest absolute value. The correction processing section corrects an error using the value of the correction bit selected by the maximum absolute value selecting section if there is a plurality of values of the correction bits selected by the maximum value selecting section.

The signal processor may further include a first error detecting section for detecting an error in the bit string after correction by the correction processing section using an additional bit which is calculated on the basis of information about the bit string which constitutes the signal and is added to the bit string.

If an error is detected by the error detection executed by the first error detecting section, the correction processing section may correct the error using a value of the correction bit selected by the maximum difference selecting section or the maximum absolute value selecting section out of the values of the correction bits determined by the correction value determination section except for the value of the correction bit in which the error has been detected.

The signal processor may further include a second error detecting section for detecting, if a cyclic redundancy check code is given to the bit string which constitutes the signals, an error using the cyclic redundancy check code with respect to the bit string after correction by the error correcting section.

If an error is detected by the error detection executed by the second error detecting section, the correction processing section may correct the error using a value of the correction bit selected by the maximum difference selecting section or the maximum absolute value selecting section out of the values of the correction bits determined by the correction value determination section except for the value of the correction bit in which the error has been detected.

If a transmission frame which constitutes the signal is divided into a plurality of blocks, the rule violation detecting section may detect code rule violation for each block; the error range specifying section may specify a range in which an error bit is included for each block; and the error correcting section may correct one bit in the range specified by the error range specifying section for each block.

The signal processor may further include a first error detecting section for detecting an error in the bit string after correction by the correction processing section for each block using an additional bit calculated on the basis of information about the bit string which constitutes each block and is added to the bit string.

The additional bit may be calculated on the basis of information about the bit string so that DC offset is approximately close to 0 on the average in the entire transmission frame which constitutes the signals.

The signal receiving section may receive signals which have a multilevel code waveform representing one bit value as a plurality of amplitude values.

The signal receiving section may receive signals which have a multilevel code waveform obtained by averaging a signal waveform of a bipolar code synchronously by clock which has a ½ frequency of that of the bipolar code.

Another embodiment of the invention is an error correction process, which may include the steps of: receiving signals encoded under a predetermined code rule; detecting code rule violation included in the signals received in the step of receiving signals; specifying a range in which an error bit is included out of a bit string which constitutes the signals on the basis of a position of code rule violation detected in the step of detecting rule violation; and correcting one error bit in the range specified in the step of specifying a range so that code rule violation detected in the step of detecting code rule violation is eliminated.

According to these embodiments of the invention, errors in data transmitted via a transmission path of relatively high transmission quality can be corrected using a relatively small-scaled circuit configuration.

BRIEF DESCRIPTION OF THE DRAWINGS

FIG. 10 illustrates an exemplary configuration of an error correction table used in implementation of the error correction process according to the embodiment;

DESCRIPTION OF THE PREFERRED EMBODIMENT

Figure 1:
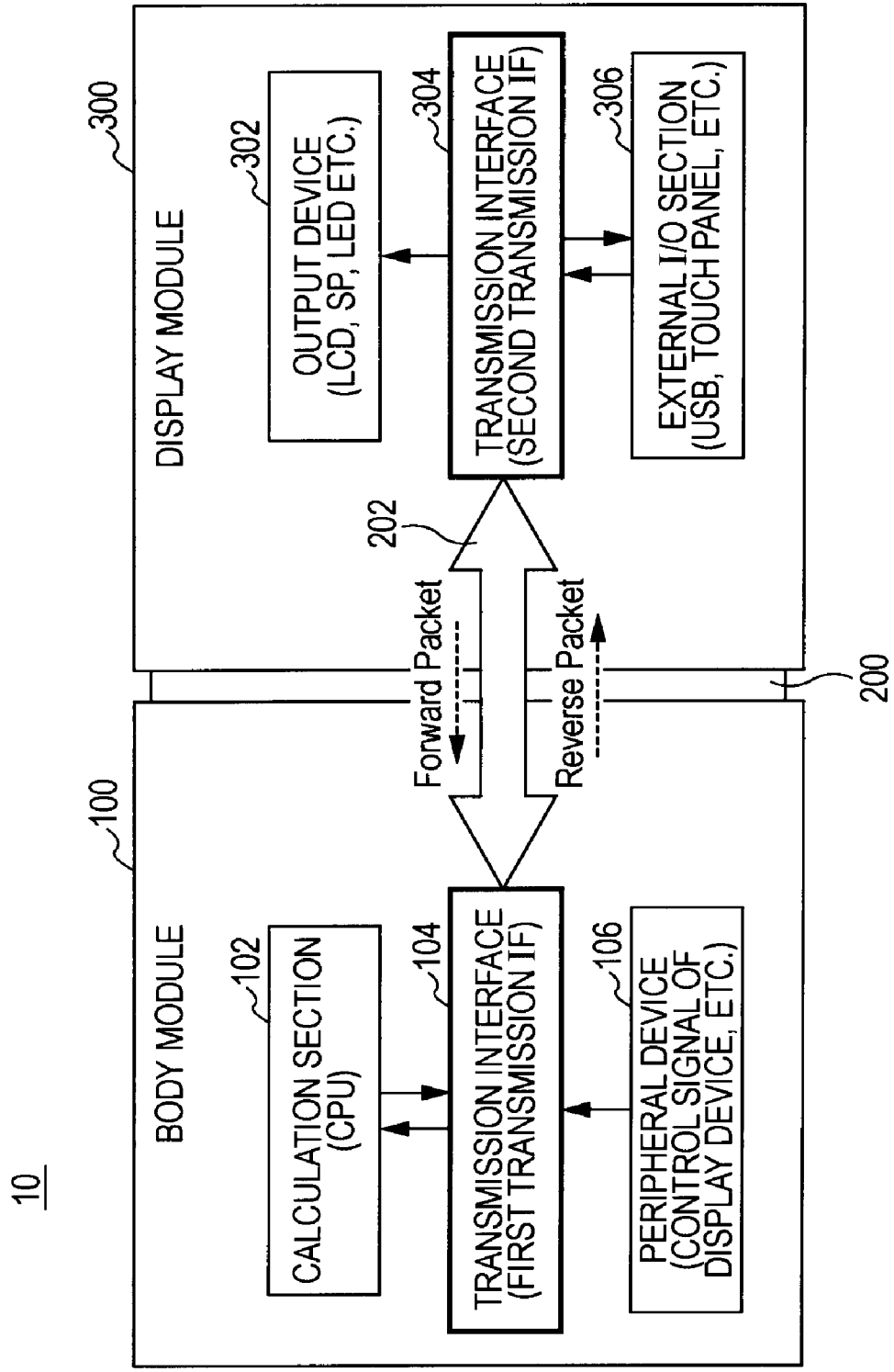
FIG. 1 illustrates an exemplary module configuration of an information processing device according to an embodiment of the invention.

Referring now to the accompanying drawings, a preferred embodiment of the invention will be described in detail. Components with substantially the same functional configurations are denoted by the same reference numerals and duplicate description thereof will be omitted.

Order of Description

An embodiment of the invention will be described in the following order. First, with reference to FIGS. 1 and 2, an exemplary configuration of an information processing device 10 according to the present embodiment will be described. A functional configuration of each of a plurality of modules of the information processing device 10 and an inter-module data transmission process will be described. Next, with reference to FIGS. 3 to 11, an error detection process and an error correction process according to the present embodiment will be described in detail in terms of an AMI coding scheme. Subsequently, with reference to FIGS. 12 and 13, a method for utilizing additional bits in the error detection process of the present embodiment will be described. Finally, operation effects provided by the technical idea of the embodiment will be summarized.

Contents
1. Embodiment
1-1. Configuration of Information Processing Device 10
1-2. Functional Configuration of Each Module
1-4. Signal Processing Method
1-4-1. Overall Process Flow
1-4-2. Error Detection Process
1-4-3. Error Correction Process
1-5. Exemplary Usage of Additional Bits
2: Conclusion

1. Embodiment

Now, an embodiment of the invention will be described. The present embodiment relates to a technique of efficiently correcting errors in data transmitted via a transmission path of relatively high transmission quality. The transmission path of relatively high transmission quality herein has, for example, a bit error rate (BER) of not higher than about $10^{-6}$. With such a transmission path, transmission errors can be sufficiently eliminated by correcting about one error bit in each frame or each block. The present embodiment therefore provides an error correction process to efficiently detect one error bit in each frame or each block on the basis of code rule violation included in received data and to correct that error bit efficiently.

1-1. Configuration of Information Processing Device 10

With reference to FIG. 1, a configuration of an information processing device 10 according to the present embodiment will be described briefly. FIG. 1 illustrates an exemplary configuration of the information processing device 10 according to the present embodiment. The information processing device 10 may, for example, be a mobile device, such as a mobile phone, a personal digital assistant, a laptop computer and a handheld game machine. Such a mobile device often includes a body module 100 and a display module 300, as in the information processing device 10 illustrated in FIG. 1. These modules are connected by a hinge section 200 which is a movable member.

Body Module 100

The body module 100 includes a calculation section 102, a first transmission interface 104 and a peripheral device 106. The calculation section 102 executes predetermined arithmetic operations. The calculation section 102 executes, for example, computation for image processing and control programs for controlling components of the information processing device 10. These functions of the calculation section 102 are implemented by a central processing unit (CPU). The calculation section 102 outputs data, such as image data and control signals, which is then input into the first transmission interface 104.

Operation data is input into the first transmission interface 104 from the peripheral device 106 as well as output values of the arithmetic operation result from the calculation section 102. The peripheral device 106 outputs, for example, signals for controlling devices in the display module. The output signals are then input into the first transmission interface 104. Data is input into the first transmission interface 104 in accordance with the control signals output from the peripheral device 106. If necessary, data is input into the calculation section 102 from the first transmission interface 104 and used for a predetermined arithmetic operation. Data input into the first transmission interface 104 is not limited to those described above. Other data, including audio data and communication data, may also be input into the first transmission interface 104.

As described above, various data is input into the first transmission interface 104 from the calculation section 102 and the peripheral device 106. Power signals may also be input into the first transmission interface 104 from a power supply, which is not illustrated. If electric power to be supplied to the display module 300 from the body module 100 is provided together with data signals, the power signals and the data signals are superimposed in the first transmission interface 104. In such a configuration in which the power signals are superimposed with the data signals, the power signals are input into the first transmission interface 104 from the power supply as described above. Driving clocks are also transmitted to the display module 300 from the body module 100. Driving clocks are thus input into the first transmission interface 104.

The first transmission interface 104 transmits signals (i.e., forward packets) to the display module 300 from the body module 100 and receives signals (i.e., reverse packets) transmitted from the display module 300. As illustrated in FIG. 1, the body module 100 and the display module 300 are electrically connected together via a transmission path 202 provided in the hinge section 200. The first transmission interface 104 thus transmits and receives signals via the transmission path 202. The hinge section 200 is constituted by a movable member as described above. Thus, if many signal lines are disposed in the hinge section 200 as the transmission path 202, transmission reliability of the transmission path 202 may be impaired significantly. To address this problem, the first transmission interface 104 transmits the signals by a coding scheme to reduce the number of signal lines used as the transmission path 202. The coding scheme will be described later.

Display Module 300

The display module 300 includes, for example, an output device 302, a second transmission interface 104 and an external I/O section 306. The output device 302 is a display means, such as a liquid crystal display (LCD) and an electroluminescence display (ELD), and an audio output device, such as a speaker and a headphone jack. Signals output from the second transmission interface 304 are input into the output device 302. The output device 302 outputs images or audio in accordance with the signals input from the second transmission interface 304. Note that the output device 302 may be a simple information output device, such as a luminescent device like a light emitting diode (LED) which simply turns light on and off and an oscillating device which has a oscillating function.

The second transmission interface 304 receives signals (i.e., forward packets) transmitted from the body module 100 via the transmission path 202 and transmits the signals (i.e., reverse packets) to the body module 100. The second transmission interface 304 inputs signals into the output device 302 in accordance with the signals received from the body module 100 and inputs data signals to the external I/O section 306. Data signals input from outside via the external I/O section 306 are input into the second transmission interface 304. Examples of the external I/O section 306 include a universal serial bus (USB) terminal and a touch panel. Data signals input into the second transmission interface 304 are transmitted to the body module 100 via the transmission path 202.

An exemplary configuration of the information processing device 10 according to the present embodiment has been described briefly. The present embodiment has been described with reference to a signal transmission model incorporated in a mobile device of relatively high transmission quality. In particular, the present embodiment is intended to be applied to a system in which data is transmitted via about one signal line disposed in the hinge section 200. Functions and designs that have been difficult to realize for their excessively large number of wires can be implemented with this configuration. In this transmission system, a multilevel code representing one bit value as a plurality of amplitude levels is used. Accordingly, amplitude margins of the transmission signals are narrower than those of the signals of differential binary which are usually used, whereby transmission errors may occur relatively easily. It is therefore necessary to perform error correction at the receiver side.

However, a rate of occurrence of the transmission errors in the signal transmission in the mobile devices to which the present embodiment is applied is relatively low. Thus, convolutional code-based error correction is too large-scale for error correction of such transmission data In addition, such a error correction process may increase a circuit size and power consumption more than necessary. It is important for mobile devices to be compact and low in power consumption. It is therefore necessary to provide sufficient error correction ability while not increasing the circuit size and power consumption.

In order to satisfy these demands, the present inventors have devised an error correction process which can provide sufficient error correction ability while not increasing the circuit size and power consumption more than necessary when applied to a transmission path of relatively high transmission quality. The error correction process is implemented by the function of the first transmission interface 104 or the second transmission interface 304 described above. In the foregoing, however, reference is not made to a functional configuration of such an error correction process. In the following description, the functional configurations of the first transmission interface 104 and the second transmission interface 304 regarding the error correction process of the present embodiment will be described in full detail.

1-2. Functional Configuration of Each Module

Figure 2:
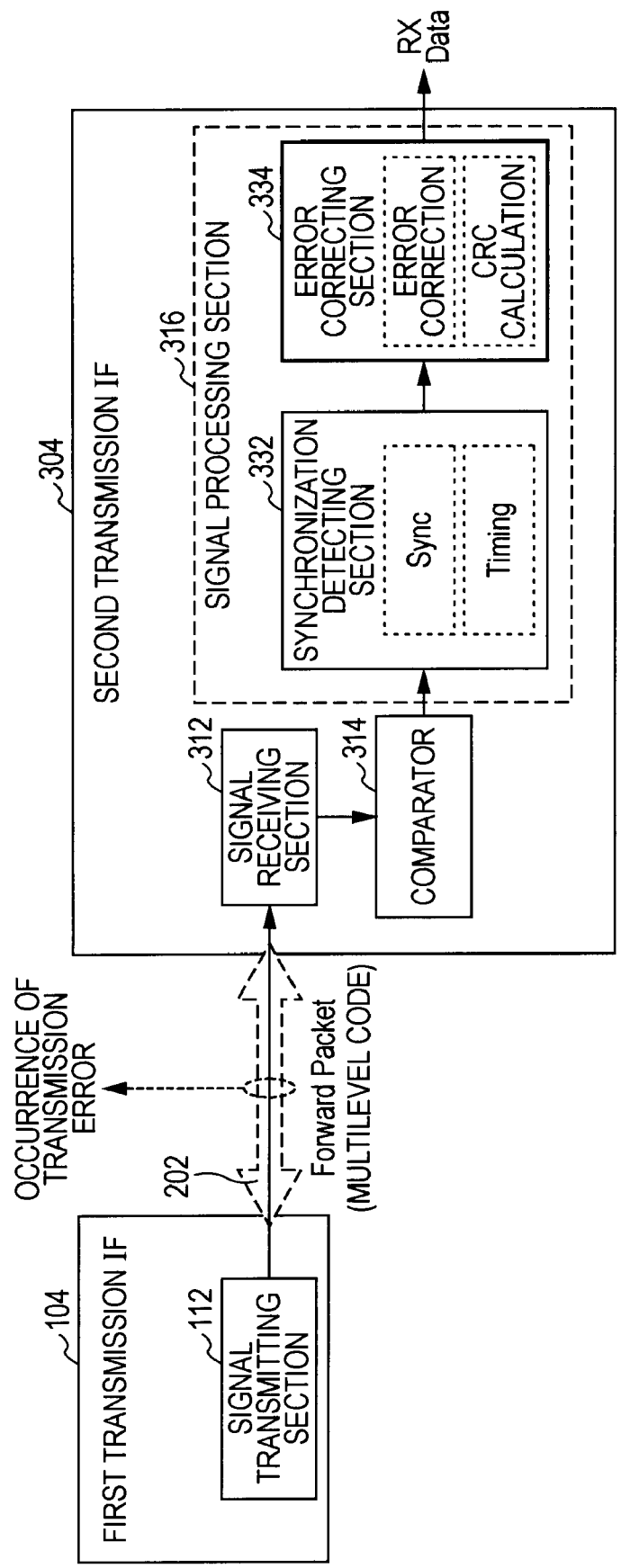
FIG. 2 illustrates an exemplary functional configuration of a transmission interface which controls inter-module data transmission in the information processing device according to the embodiment.

First, with reference to FIG. 2, the functional configurations of the first transmission interface 104 and the second transmission interface 304 according to the present embodiment will be described in detail. FIG. 2 illustrates the functional configurations of the first transmission interface 104 and the second transmission interface 304 according to the present embodiment. For the ease of description, a unidirectional transmission (i.e., forward packet transmission) will be described. The first transmission interface 104 is a transmitter side and the second transmission interface 304 is a receiver side. Bidirectional transmission can easily be implemented by the first transmission interface 104 and the second transmission interface 304 each having components of both the interfaces 104 and 304, which will be described later.

First Transmission Interface 104

First, the first transmission interface 104 will be described. As illustrated in FIG. 2, the first transmission interface 104 mainly includes a signal transmitting section 112.

Figure 3:
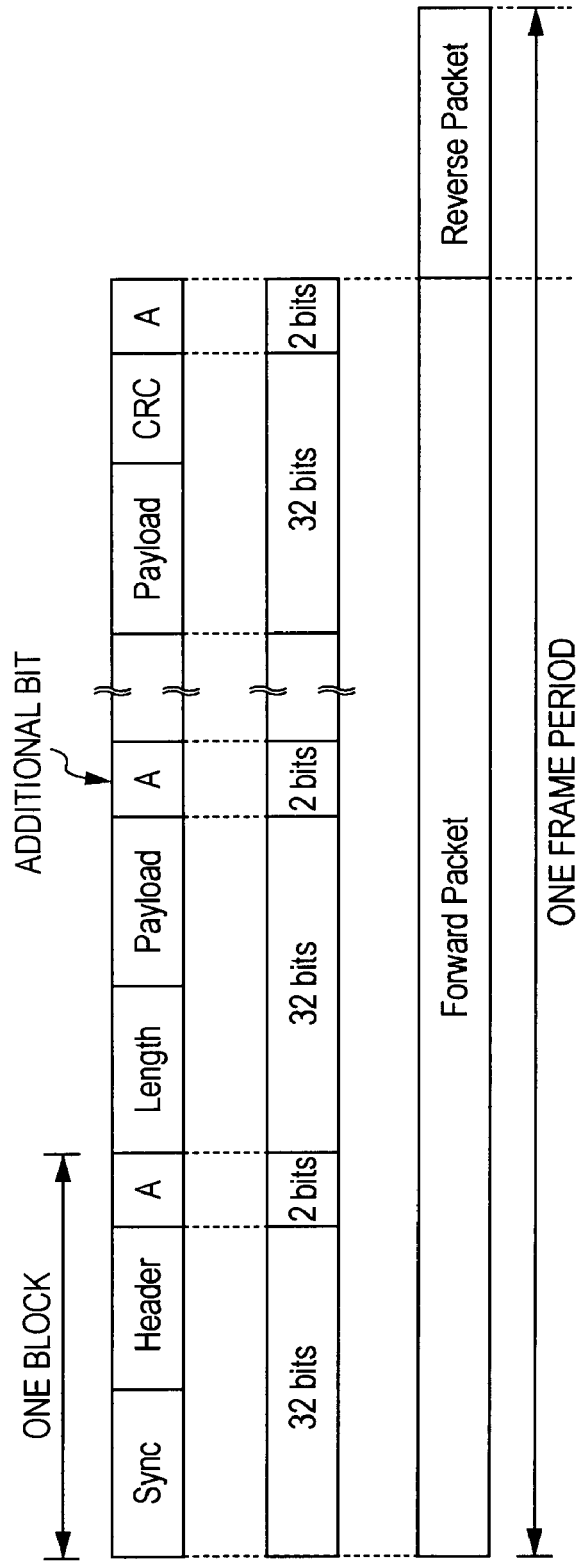
FIG. 3 illustrates an exemplary frame configuration used for inter-module data transmission in the information processing device according to the embodiment.

The signal transmitting section 112 adds a header to the transmission data (i.e., a payload) and generates a transmission frame (see FIG. 3). Once the transmission frame is generated, the signal transmitting section 112 encodes a bit string of the generated transmission frame and generates code data. The signal transmitting section 112 then transmits the generated code data to the second transmission interface 304 via the transmission path 202. A multilevel coding scheme is employed herein as a coding scheme in order to reduce the number of signal lines used in the transmission path 202 and to reduce power consumption of the information processing device 10. The term multilevel coding scheme used herein means a scheme which uses code data representing one bit value as a plurality of amplitude levels.

For example, the signal transmitting section 112 converts transmission data into code data, such as a AMI code and a partial response code, averages the code data synchronously by clock and generates multilevel code data. Note that code data generated in a bipolar coding scheme includes no DC component. Such code data can be transmitted in a superimposed manner with the power signals supplied from a direct current power supply. It is also possible to reproduce the clock from the received signals at the receiver side without using a PLL by transmitting the code data synchronously averaged by clock. Power consumption can thus be reduced because necessity to provide the PLL is eliminated. When being transmitted in a superimposed manner with the power signals, transmission data, clock and electric power can be transmitted to the receiver side in a single power line.

Configuration of Transmission Frame

With reference to FIG. 3, a configuration of the transmission frame will be described. As illustrated in FIG. 3, the transmission frame includes a synchronization bit (Sync), a header (Header), a frame length (Length), a payload (Payload) and a cyclic redundancy check (CRC) bit. In the present embodiment, 2 additional bits (A) are added to each block. Each block herein is constituted by a 34-bit string in which a bit string except for the additional bits is delimited into 32 bits and 2 additional bits (A) are added as delimiter bits. The additional bits (A) of each block are bit values calculated from the 32-bit string except for the additional bits (A). The additional bits (A) are used for error detection.

Each bit string which constitutes the transmission frame, the data size and data type of each block, the method for delimiting the block and the data type to which the additional bits (A) are added may be changed suitably. Time division duplex (TDD) system may be employed when the aforementioned transmission frame is extended for bidirectional transmission. In the TDD system, one frame period is constituted by a pair of forward packet and reverse packet. The frame period is repeated to implement bidirectional transmission.

The functional configuration of the first transmission interface 104 has been described. As described above, the technique according to the present embodiment includes the error correction process implemented at the receiver side. Hereinafter, a functional configuration of the second transmission interface 304 which can implement the error correction process will be described.

Second Transmission Interface 304

As illustrated in FIG. 2, the second transmission interface 304 includes a signal receiving section 312, a comparator 314 and a signal processing section 316. The signal processing section 316 is constituted by a synchronization detecting section 332 and an error correcting section 334.

First, transmission signals of multilevel code data transmitted from the first transmission interface 104 is received by the signal receiving section 312. The transmission signals received by the signal receiving section 312 are then input into the comparator 314. If the power signals are transmitted in a superimposed manner with the transmission signals, the signal receiving section 312 isolates and removes the power signals and then inputs the transmission signals of the multilevel code data including no DC component into the comparator 314. The, power signals isolated and removed from the transmission signals are supplied to each component of the display module 300 as driving power.

The comparator 314 determines an amplitude level of the transmission signals on the basis of a predetermined threshold and restores the multilevel code data. The multilevel code data restored in the comparator 314 is input into the signal processing section 316. Once the multilevel code data is input into the signal processing section 316, frame synchronization of the multilevel code data is performed by the synchronization detecting section 332 and frame synchronized data is input into the error correcting section 334. Once the multilevel code data is input into the error correcting section 334, the error correcting section 334 detects an error bit on the basis of the multilevel code data. The error correcting section 334 detects code rule violation on the basis of the decoded data obtained by decoding the multilevel code data and specifies a range in which the error bit is included on the basis of the detected code rule violation.

It is assumed that one error bit is included in the specified range. The error correcting section 334 makes error correction to each bit in the specified range so that detected code rule violation is eliminated and then generates error-corrected decoded data. The error correcting section 334 calculates a value of the additional bits using each error-corrected decoded data, and determines whether the calculation result corresponds to a value of the additional bits included in the decoded data. Whether each decoded data is correct or incorrect is determined on the basis of the determination result to provide suitably error-corrected decoded data. The suitably error-corrected decoded data is output as received data (RX Data) with the additional bits being eliminated.

The functional configuration of the second transmission interface 304 has been described. As described above, the technique according to the present embodiment includes the steps of detecting code rule violation during detecting the error bit and specifying a range in which the error bit is included on the basis of the code rule violation. The technique also includes the steps of performing error correction for each bit included in the specified range and detecting suitably error-corrected decoded data. Hereinafter, these characteristics will be described in more detail.

1-4. Signal Processing Method

Next, a signal processing method according to the present embodiment will be described. The signal processing method herein is implemented using the components of the first transmission interface 104 (i.e., the transmitter side) and the second transmission interface 304 (i.e., the receiver side). The signal processing method includes an error detection process for detecting a transmission error included in the received signals and an error correction process for correcting a transmission error detected with the error detection process. In the following description, an overall process flow of the signal processing method will be described first. Subsequently, the error detection process and the error correction process will be described in full detail.

1-4-1. Overall Process Flow

Figure 4:
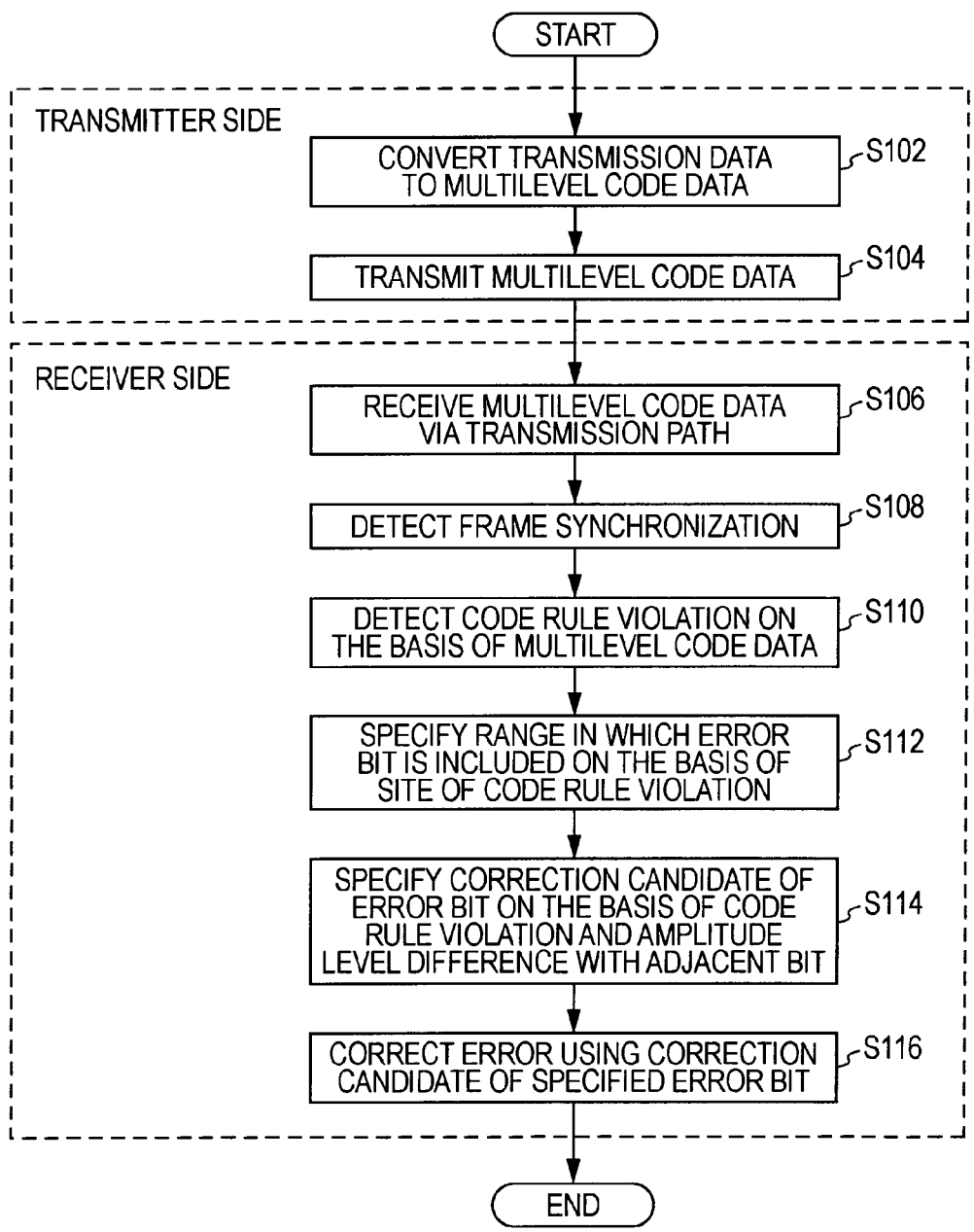
FIG. 4 roughly illustrates a process flow of data transmission and error correction according to the embodiment.

With reference to FIG. 4, an overall process flow of the signal processing method according to the present embodiment will be described. FIG. 4 illustrates an overall flow of the signal processing method beginning with a generation process of multilevel code data and ending with a generation process of received data.

As illustrated in FIG. 4, transmission data is first converted into multilevel code data by the signal transmitting section 112 of the first transmission interface 104 (S102). In particular, in step S102, a header is added to the transmission data by the signal transmitting section 112 to generate a transmission frame, which is then encoded by a multilevel coding scheme. For example, the transmission frame is encoded by the AMI coding scheme and the code data generated by the encoding process is averaged synchronously by clock so as to generate multilevel code data. Subsequently, the transmission signals of the multilevel code data is transmitted to the second transmission interface 304 by the signal transmitting section 112 (S104).

Subsequently, the signal receiving section 312 of the second transmission interface 304 receives the transmission signal of the multilevel code data transmitted via the transmission path 202 (S106). The transmission signals are input into the comparator 314 from the signal receiving section 312 and threshold-based determination is made on the amplitude level of the transmission signals by the comparator 314. The multilevel code data is then generated from the transmission signals. If, however, the amplitude level of the transmission signals is changed significantly in the transmission path 202, a wrong determination result will be output from the comparator 314. That is, an error bit will be included in the multilevel code data. The present embodiment relates to a method for correcting such an error bit.

The multilevel code data generated by the comparator 314 is input into the synchronization detecting section 332. The synchronization detecting section 332 detects the frame synchronization (S108). Subsequently, the multilevel code data is input into the error correcting section 334 from the synchronization detecting section 332 and code rule violation is detected on the basis of state transition (described later) obtained by decoding the multilevel code data (S110). Subsequently, the error correcting section 334 specifies a range in which the error bit is included on the basis of a position of the detected code rule violation (S112). The error correcting section 334 specifies the range, assuming that one error bit is included in each block (or each frame).

Subsequently, the error correcting section 334 specifies a candidate error bit which can eliminate the code rule violation by correcting the error to be corrected for each bit with respect to the bit string in the specified range (S114). When there is a plurality of error bits to be corrected which can eliminate the code rule violation, the error correcting section 334 compares the amplitude level of the corrected error bit with the amplitude level of a previous adjacent bit of the error bit and selects a candidate with the largest amplitude level difference. When there is a plurality of candidates, a candidate with a maximum absolute value of the amplitude level after correction is selected. The error correcting section 334 then makes error correction with respect to the specified candidate error bit (S116). Actually, since a bit value after error correction regarding the candidate error bit has been already obtained, a bit string having the bit value after error correction is output.

The overall process flow of the signal processing method according to the present embodiment has been described. In the signal processing method described above, the range which includes the error bit is specified on the basis of code rule violation during error detection. Then, error correction is made for each bit in the specified range so as to specify a bit as a candidate error bit which eliminates the detected code rule violation and has the maximum amplitude level difference between the previous adjacent bit and the error bit. Error correction is made with respect to the specified error bit. With this configuration, errors can be corrected efficiently without an increase in power consumption and circuit size in an environment with high transmission quality where only about one error bit occurs in each frame or each block.

1-4-2. Error Detection Process

Here, the error detection process according to the present embodiment will be described in detail. In the following description, the error detection process is described in detail in terms of the error detection process applied to an AMI code-based multilevel code data.

AMI Code Rule

An AMI code rule will be described briefly. The AMI code is a bipolar code which takes logical values of +1, 0 and −1. If data 1 is input and an AMI code value corresponding to the previous data 1 is +1, the input data will be converted into −1. Similarly, if data 1 is input and an AMI code value corresponding to the previous data 1 is −1, the input data will be converted into +1. If data 0 is input, the input data is converted into 0 irrespective of previous data. Since the data is converted on the basis of such a conversion rule, the AMI code is a DC balanced code.

Figure 5:
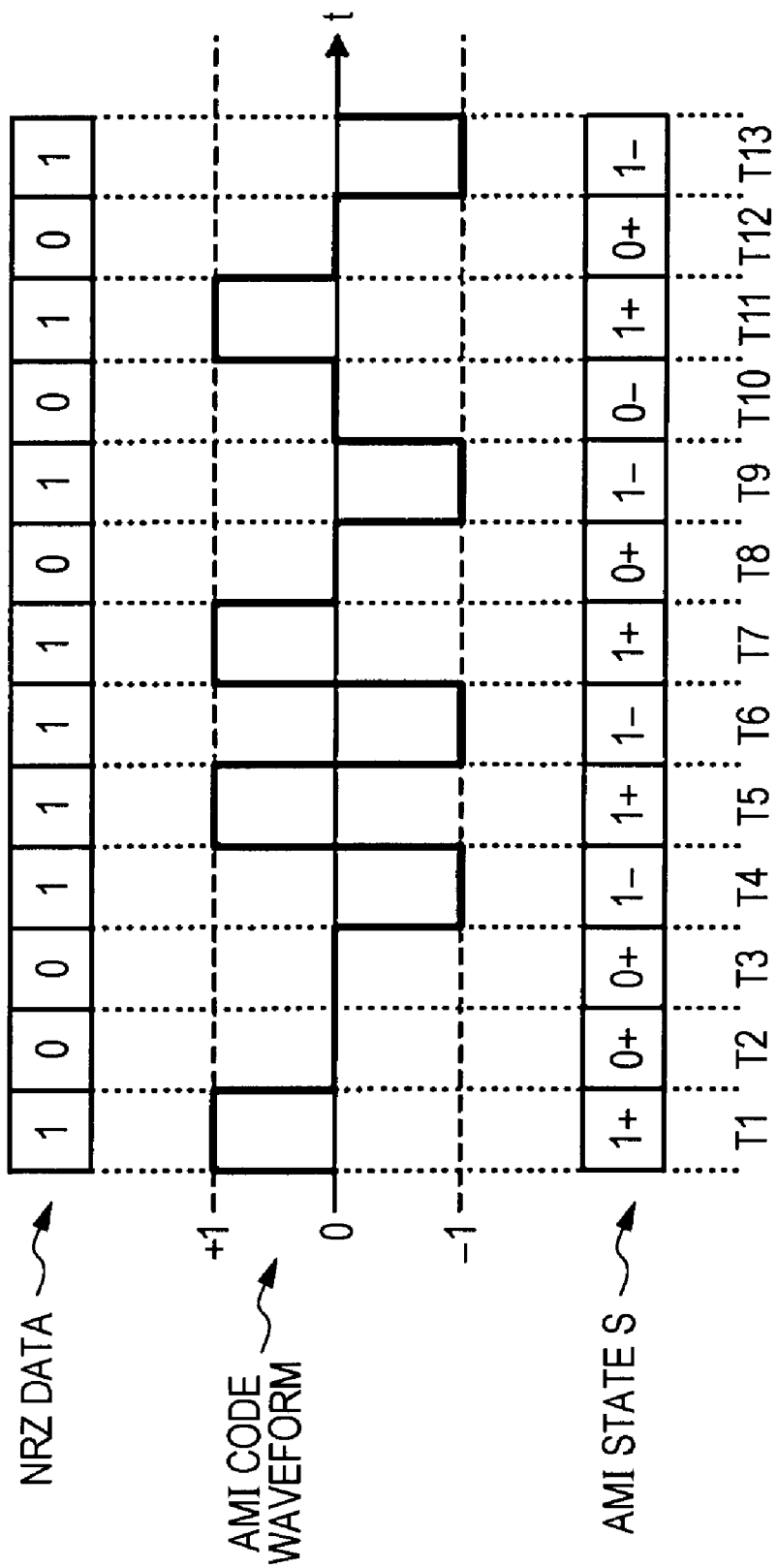
FIG. 5 illustrates definition of an AMI code rule and state transition in accordance with the AMI code rule.

For example, as illustrated in FIG. 5, when NRZ data "1, 0, 0, 1, 1, 1, 1, 0, 0, 1, 0, 1, 0, 1" is input, an AMI code waveform (i.e., an amplitude level) corresponding to the NRZ data is "1, 0, 0, −1, 1, −1, 1, 0, −1, 0, 1, 0, −1." An index of AMI state S is introduced. The AMI state S is defined as a value obtained by combining a polarity (+/−) of the value and the amplitude level of the previously input data 1. For example, if the amplitude level of the AMI code waveform is 1, the AMI state S is 1+. Similarly, if the amplitude level of the AMI code waveform is −1, the AMI state S is 1−. With the amplitude level of the AMI code waveform being 0, the AMI state S is 0+ when the amplitude level of the AMI code waveform corresponding to the previous data 1 is "+," and the "−" AMI state S is 0− when the amplitude level of the AMI code waveform corresponding to the previous data 1 is "−."

Figure 6:
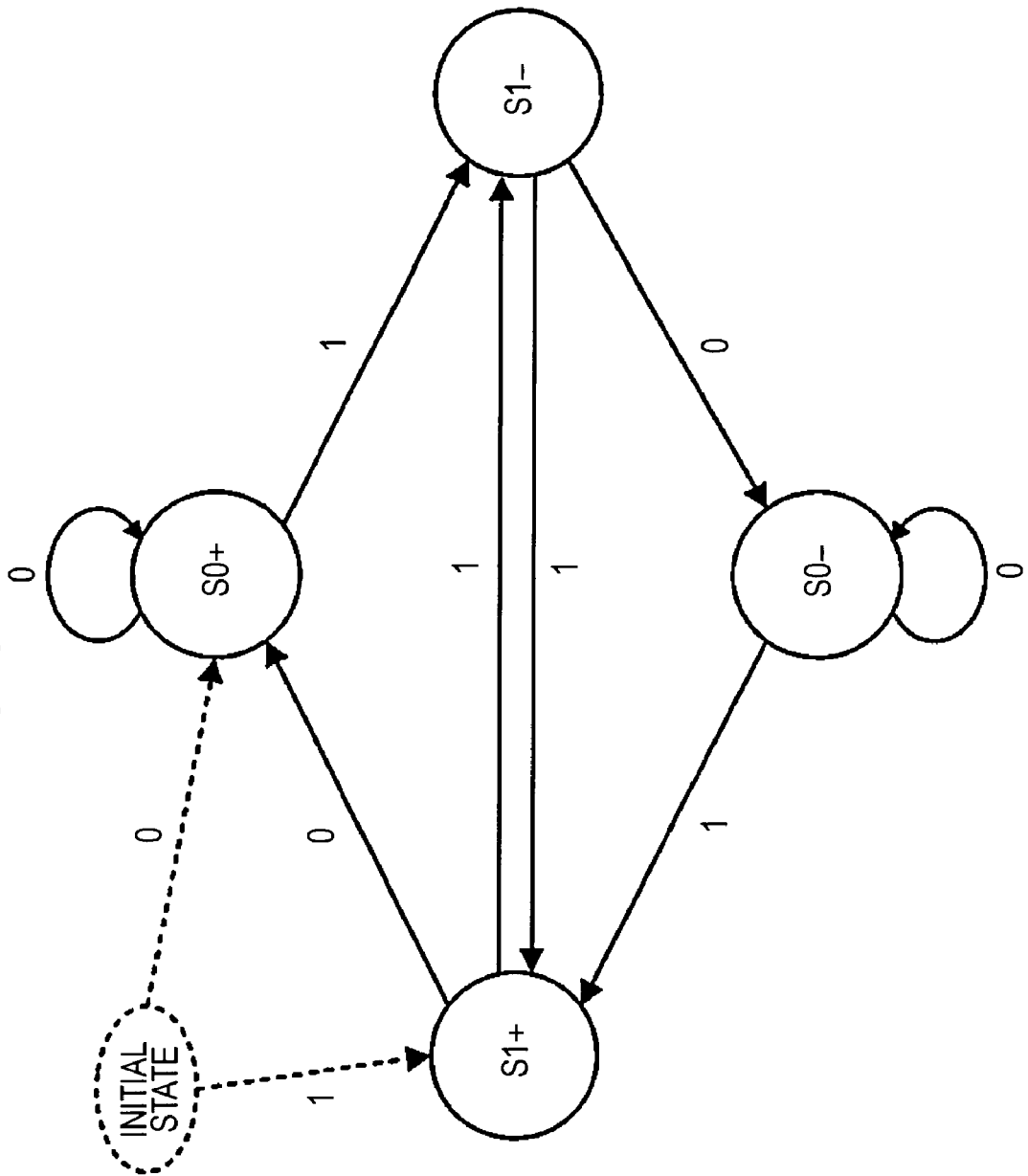
FIG. 6 illustrates a state transition pattern implementable in accordance with the AMI code rule.

In the following description, the AMI state is sometimes represented as "S1+," "S1−," "S0+," and "S0−." FIG. 6 illustrates the AMI code rule using the AMI state S on the basis of such a definition of the AMI state S. FIG. 6 illustrates each AMI state "S1+," "S1−," "S0+," and "S0−" and possible transition between the AMI states represented by arrows. A number given in each arrow represents data to be input subsequently. For example, an arrow extending from "S0+" to "S1−" represents that a state is changed to "S1−" when data 1 is input with the AMI state being "S0+." A transition destination from the initial state is previously set for each initially input data. In the example illustrated in FIG. 6, the transition state is previously set so that the AMI state is changed to "S0+" when data 0 is input in the initial state and changed to "S1+" when data 1 is input in the initial state.

It is apparent from the state transition diagram of FIG. 6 that there exist state transitions permitted by the AMI code rule and state transition not permitted by the AMI code rule. For example, the state transition from "S0−" to "S1+" is permitted by the AMI code rule. However, the state transition from "S0+" to "S1+" is not permitted by the AMI code rule. "S0+" represents that the amplitude level of the previously input data 1 was "+." In accordance with the AMI code rule, a subsequently input data 1 has an inverted polarity of "−" of the amplitude level. That is, in accordance with the AMI code rule, when data 1 is input with the AMI state being "S0+," state transition to "S1+" commits code rule violation (CRV). Such code rule violation can be utilized to detect a transmission error at the receiver side except for being used positively at the transmitter side.

Method for Generating Multilevel Code Data

Figure 7:
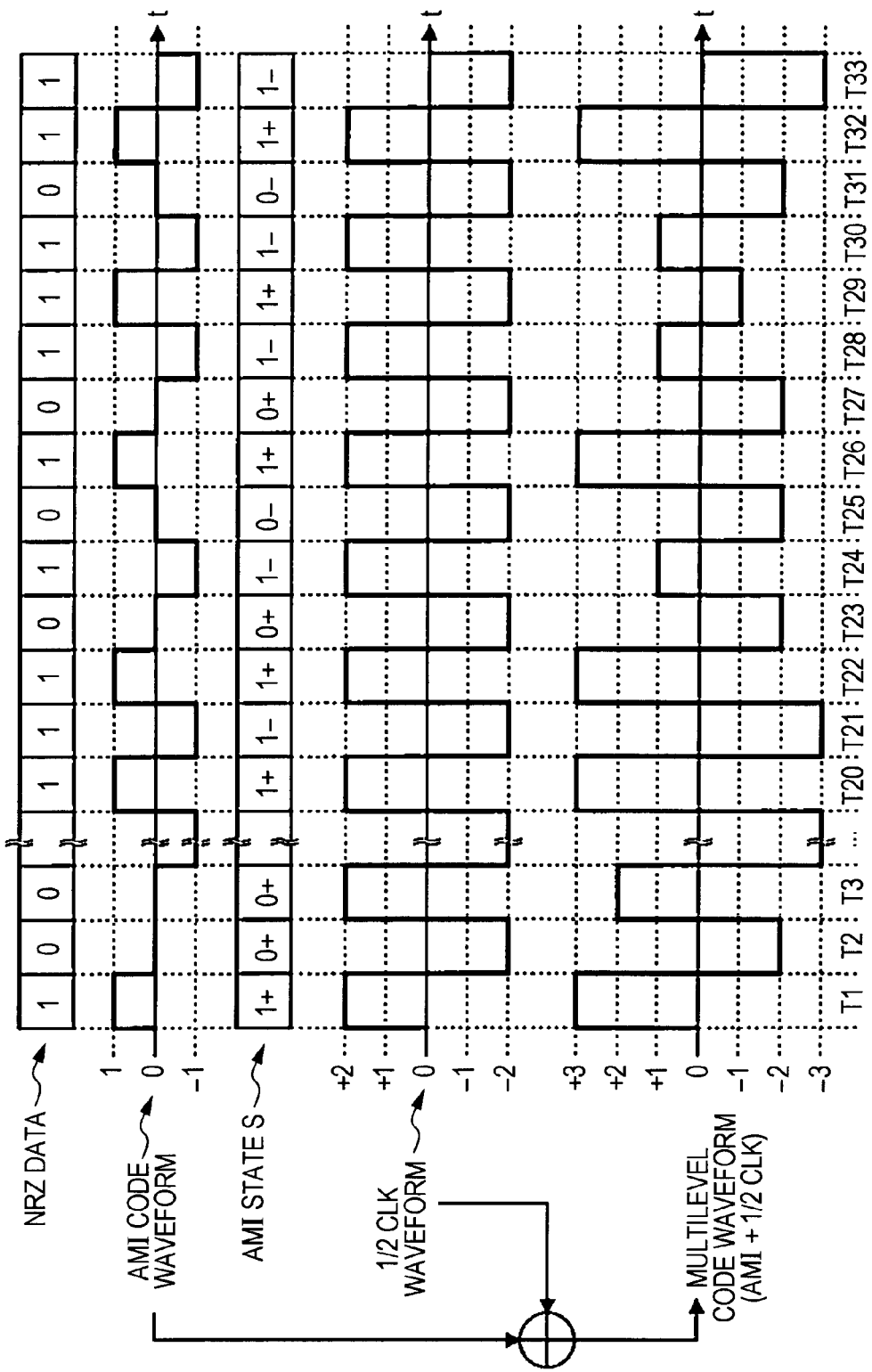
FIG. 7 illustrates a method for generating a multilevel code which can be used for inter-module data transmission in the information processing device according to the embodiment.

Next, a method for generating multilevel code data will be described with reference to FIG. 7. FIG. 7 illustrates a method for generating AMI code-based multilevel code data. FIG. 7 illustrates exemplary NRZ data, an AMI code waveform, an AMI state S, clock (i.e., a ½CLK waveform) and a multilevel code waveform. The NRZ data is the transmission data. The AMI code waveform is a signal waveform of the AMI code produced by encoding the NRZ data by the AMI coding scheme. The ½CLK waveform is a clock of ½ in frequency synchronized with a phase of the AMI code waveform. The multilevel code waveform is a signal waveform produced by synchronously averaging the AMI code waveform with the ½CLK waveform. As described above, the multilevel code waveform is generated by the function of the signal transmitting section 112.

Once the NRZ data is input, the signal transmitting section 112 converts the NRZ data into an AMI code waveform. The AMI code rule has been described. For example, 34-bit NRZ data "1, 0, 0, . . . , 1, 1, 1, 0, 1, 0, 1, 0, 1, 1, 1, 0, 1, 1" is converted into the AMI code waveform illustrated in FIG. 7. As is apparent from the AMI code waveform, the AMI state S is "1+, 0+, 0+, . . . , 1+, 1−, 1+, 0+, 1−, 0−, 1+, 0+, 1−, 1+, 1−, 0−, 1+, 1−." As described above, the polarity of the amplitude level value is inverted whenever bits corresponding to data 1 are input. With the AMI state S, whether or not a bit string satisfies the AMI code rule can be easily determined by referring to the AMI state S (especially, +/−) of an adjacent bit.

Once the AMI code waveform is generated, the signal transmitting section 112 generates a multilevel code waveform with the ½CLK waveform and the generated AMI code waveform superimposed with each other. The width in the amplitude level of the ½CLK waveform is larger than that in the amplitude level of the AMI code waveform. In the example of FIG. 7, the amplitude level of the ½CLK waveform is −2 to +2 while the amplitude level of the AMI code waveform is −1 to +1. That is, the peak-to-peak width in the amplitude level of the ½CLK waveform is 4 while the peak-to-peak width in the amplitude level of the AMI code waveform is 2. When these waveforms are averaged synchronously, as illustrated in FIG. 7, a multilevel code waveform with the peak-to-peak width in the amplitude level being 6 will be generated.

In the example of FIG. 7, the AMI code waveform may take 3 level values of +1, 0 and −1. The ½CLK waveform may take 2 level values of +2 and −2. Accordingly, the multilevel code waveform illustrated in FIG. 7 may take 6 level values of +3, +2, +1, −1, −2 and −3. That is, 6-value code data is generated in the example of FIG. 7. The transmission signal having the thus-generated multilevel code waveform is transmitted to the second transmission interface 304 by the signal transmitting section 112 via the transmission path 202. The configuration of the amplitude level illustrated in FIG. 7 is illustrative only and the amplitude level may be otherwise determined.

For the ease of illustration, the method for generating the multilevel code waveform through signal addition has been described. Alternatively, a method for generating a multilevel code waveform using digital to analog (DA) transducer may be employed. That is, as illustrated in FIG. 7, any methods may be employed which can form a signal waveform with an AMI code being averaged synchronously by clock. The method for generating the multilevel code waveform (i.e., the multilevel code data) has been described. The described method for generating the multilevel code waveform may also be applied to generation of a multilevel code waveform based on a bipolar code other than the AMI code.

Method of Detecting Code Rule Violation

Figure 8:
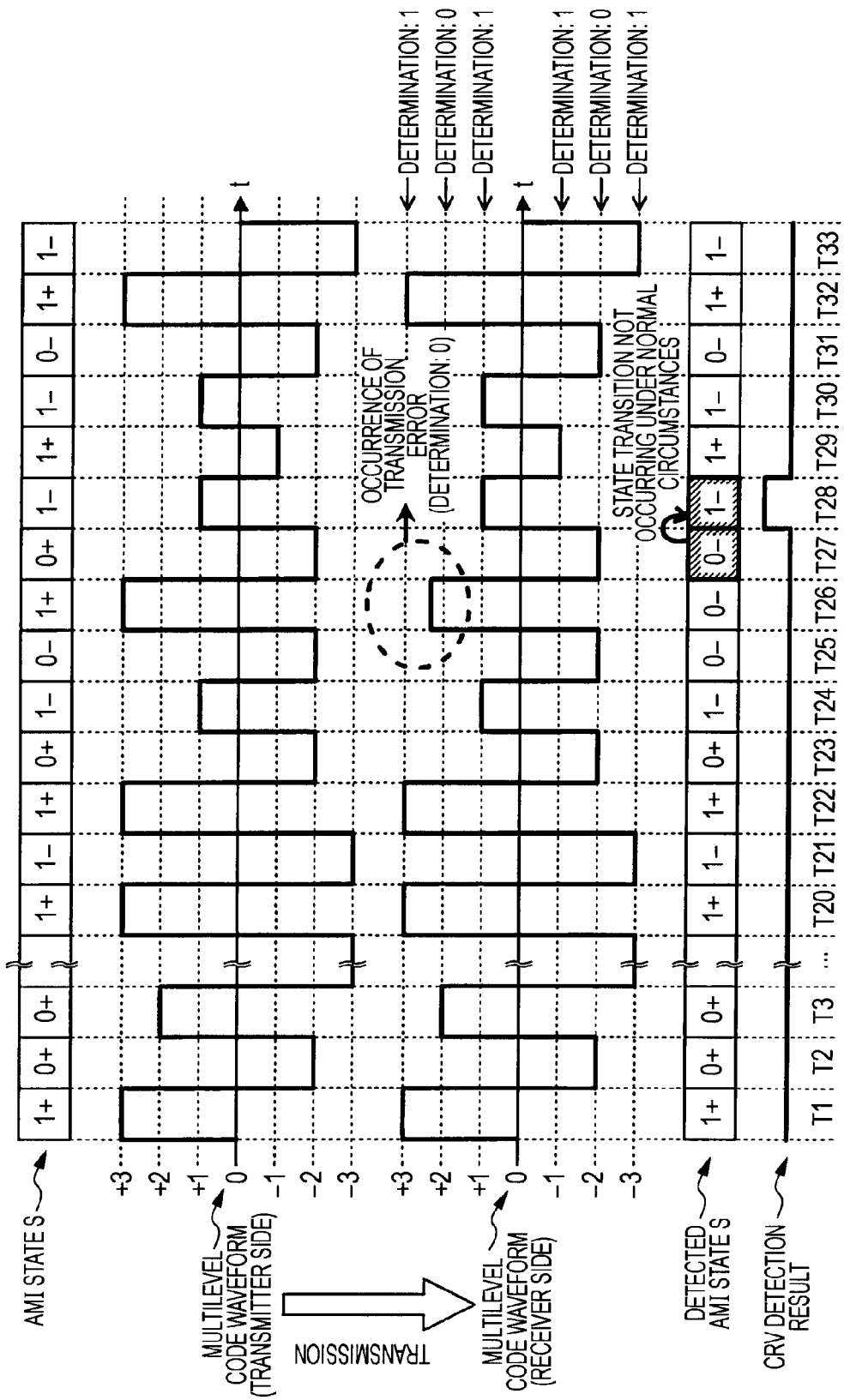
FIG. 8 illustrates an exemplary method for detecting code rule violation according to the embodiment.

Next, an error detection process performed at the receiver side will be described in detail. The error detection process according to the present embodiment relates to a method for efficiently detecting an error bit on the basis of the code rule violation of the AMI code. With reference to FIG. 8, a method for detecting code rule violation will be described. FIG. 8 illustrates the method for detecting the code rule violation executed when the transmission signal of the multilevel code waveform illustrated FIG. 7 is received. FIG. 8 illustrates an AMI state S and a multilevel code waveform at the transmitter side and a multilevel code waveform and an AMI state S detected from the multilevel code waveform at the receiver side. FIG. 8 also illustrates a detection result of the code rule violation on the basis of the AMI state S detected at the receiver side.

With reference to the multilevel code waveform of the transmitter side and the multilevel code waveform of the receiver side, it is found that the amplitude level of the multilevel code waveform at the receiver side is abnormally changed a position of the bit T26. In particular, it is found that the amplitude level at the receiver side is lowered to the range of +2 to +2.5 while the amplitude level thereat at the transmitter side is +3. Once the amplitude level is thus lowered, the threshold-based determination executed by the comparator 314 may provide a wrong determination result. In the multilevel code waveforms illustrated in FIGS. 7 and 8, thresholds are set at, for example, the amplitude levels of +2.5, +1.5, 0, −1.5 and −2.5. The threshold-based determination determines for each bit that the amplitude level of the multilevel code waveform is either of the +3, +2, +1, −1, −2 or −3. Accordingly, in this example, the amplitude level of the bit T26 is wrongly determined to be +2 (corresponding to the amplitude level 0 of the AMI code waveform) which actually is +3.

The result thus determined by the comparator 314 is input into the error correcting section 334 via the synchronization detecting section 332 as the multilevel code data of the receiver side. The error correcting section 334 detects the AMI state S on the basis of the input multilevel code data. If the transmission errors described above has occurred, the detected AMI state S includes state transition which will not occur under normal circumstances (i.e., code rule violation). The error correcting section 334 then specifies an occurrence position of the code rule violation on the basis of the detected AMI state S. In the example of FIG. 8, the code rule violation occurs in the AMI states S of the bits T27 and T28. From this fact, it can be detected that a transmission error has occurred before the bit T28.

With the AMI code rule, occurrence of the code rule violation is determined on the basis of a relationship between the AMI state S corresponding to certain data 1 and the AMI state S corresponding to data 1 previous to the certain data 1. Thus, when a bit of the code rule violation is detected, a range between that bit and a bit corresponding to the previous data 1 is specified as a range including the error bit. For example, in the example of FIG. 8, since the code rule violation is detected at the bit T28, a range (T24 to T28) between that bit T28 and the bit T24 corresponding to the previous data 1 is a range including the error bit. With the range being thus specified, an error bit position at which the thus-detected code rule violation is eliminated with error correction for each bit included in the range between the bits T24 and T28 and a correction value of the error bit can be determined. Note that, in the error detection process described above, it is assumed that a one bit transmission error is included in a retrieving range of the error bit (for example, each block).

The error detection process according to the present embodiment has been described. As described above, the error detection process according to the present embodiment determines occurrence of a transmission error by detecting code rule violation and, if any transmission error has occurred, specifies the range including an error bit. Therefore, the position of the error bit is not uniquely specified at this time. In other words, the error detection process herein specifies candidate error bits. Hereinafter, a method for detecting a correct position of the error bit which should be corrected among the candidate error bits specified herein and suitably correcting the error bit will be described.

1-4-3. Error Correction Process

Figure 9:
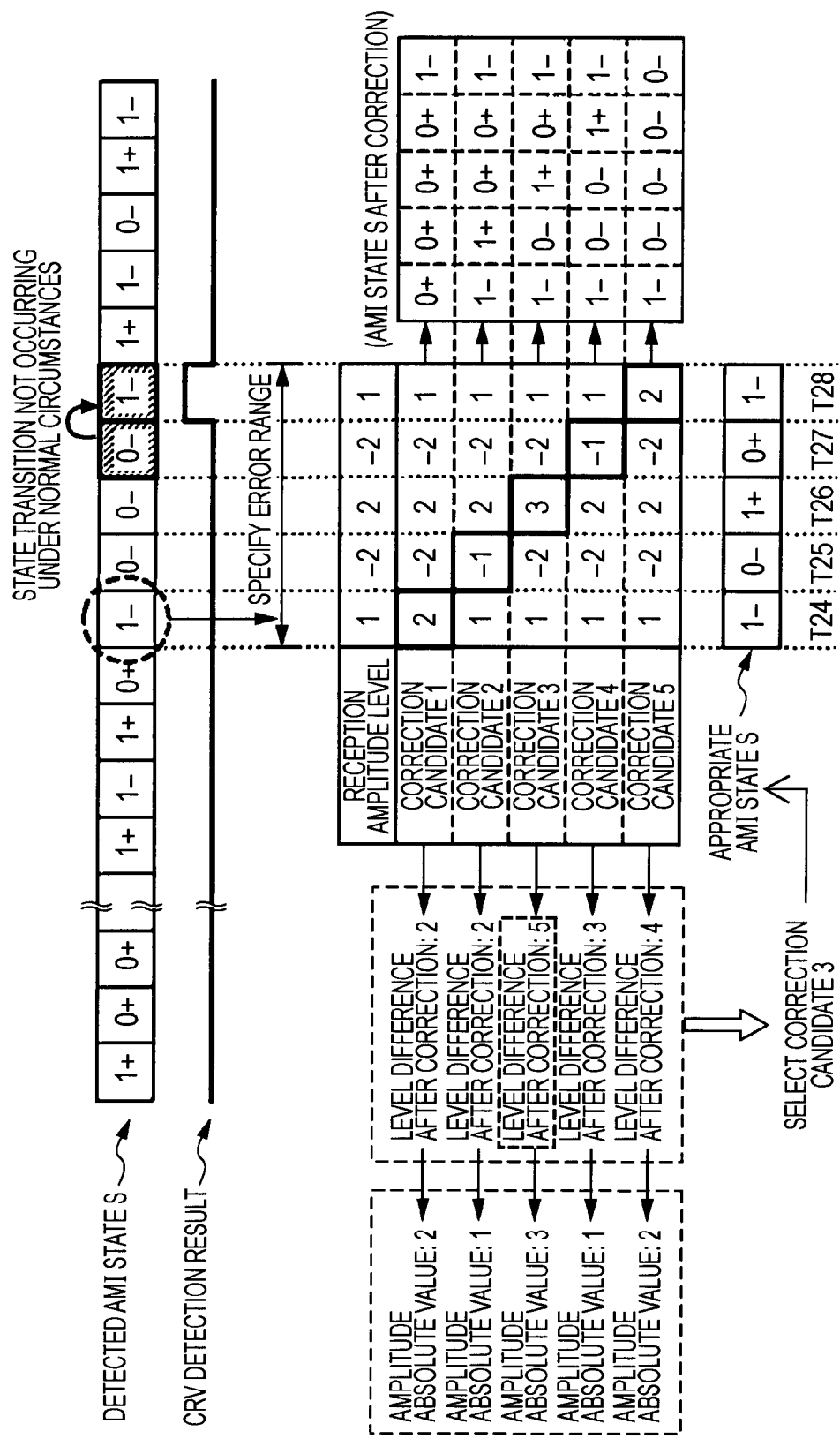
FIG. 9 illustrates an exemplary error correction process according to the embodiment.

Referring now to FIG. 9, an error correction process according to the present embodiment will be described. FIG. 9 illustrates an AMI state S acquired from the multilevel code waveform of the receiver side illustrated in FIG. 8 and a detection result of the code rule violation. FIG. 9 also illustrates an error correction process of the present embodiment executed on the basis of these AMI state S and detection result of the code rule violation. The error correction process will be described hereinafter.

As described above, the range (hereinafter, referred to as the "error range") in which the error bit is included is a range (T24 to T28) between a position of the code rule violation detected with the above-described error detection process and a bit position of the previous data 1. In the example of FIG. 8, the receiving amplitude level of the multilevel code waveform in the error range is "1, −2, 2, −2, 1." The AMI states S acquired from the receiving amplitude levels are "1−, 0−, 0−, 0−, 1−." The code rule violation "S0−" to "S1−" is included in the AMI state S. There are many correction candidates to correct the receiving amplitude levels included in the error range by one bit and to eliminate the above-described code rule violation. However, since the present embodiment is assumed to be applied to a transmission environment of relatively high transmission quality, variation occurring in the amplitude level of the multilevel code waveform is considered to be small. It is therefore not necessary to consider the correction candidates corresponding to bits where the amplitude levels change largely (i.e., more than two levels) in the transmission path 202.

In the present embodiment, possible errors in the amplitude levels of +3 as +2, +2 as +1 or +3, +1 as +2, −1 as −2, −2 as −1 or −3 and −3 as −2 will be considered. That is, it is assumed that no variation greater than two levels may occur. Under such assumption, error correction candidates may be shown in a table (hereinafter, referred to as an error correction table) illustrated in FIG. 10. The error correction table includes amplitude level values (i.e., error level values and correction level values) before and after the error correction and NRZ values corresponding to the amplitude level values. The AMI states S of the previous bits of the error bit candidates are also shown with the amplitude level values before the error correction.

For example, if the receiving amplitude level (i.e., the error level value) corresponding to the error bit candidate is +3, the amplitude level is corrected to the correction level value of +2. If the error level value is +2 and the AMI state S of the previous bit is "+," the amplitude level is corrected to the correction level value of +1. On the other hand, if the AMI state S of the previous bit is "−," the amplitude level is corrected to the correction level of +3. The AMI state S of the previous bit is referred to in order to prevent new code rule violation from occurring in the AMI state S after error correction. For example, if the AMI state S of the previous bit is "+" and the correction level value is set to +3 (i.e., +1 of the AMI code waveform), the AMI state S1+ of the correction bit follows the AMI state S1+ or S0+ corresponding to the previous bit, which commits the code rule violation of the AMI code. Thus, the correction level values corresponding to the error level values +2 and −2 are dependent on the AMI state S of the previous bit.

Now, FIG. 9 is referred to again. On the basis of the correcting condition of the error correction table illustrated in FIG. 10, five correction candidates are specified with respect to the receiving amplitude level of the error range illustrated to FIG. 9. First, a correction candidate 1 will be considered. The correction candidate 1 is a correction proposal when the bit T24 is an error candidate to be corrected. The receiving amplitude level +1 (i.e., the error level value) is first referred to. With reference to the error correction table of FIG. 10, the correction level value corresponding to the error level value +1 is +2. Accordingly, the multilevel code data "+2, −2, +2, −2, +1" with the amplitude level of the bit T24 being corrected to +2 is obtained as a correction proposal for the correction candidate 1. This correction proposal corresponds to the AMI states S "0+, 0+, 0+, 0+, 1−." This result shows that the code rule violation detected with the above-described error detection process is eliminated.

Next, a correction candidate 2 will be considered. The correction candidate 2 is a correction proposal when the bit T25 is an error candidate to be corrected. The receiving amplitude level −2 (i.e., the error level value) is first referred to. With reference to the error correction table of FIG. 10, the correction level value corresponding to the error level value −2 is −1 or −3. An AMI state S of the bit T24 located previous to the bit T25 is "−." Accordingly, the multilevel code data "+1, −1, +2, −2, +1" with the amplitude level of the bit T25 being corrected to −2 is obtained as a correction proposal for the correction candidate 2. This correction proposal corresponds to the AMI states S "1−, 1+, 0+, 0+, 1−." This result shows that the code rule violation detected with the above-described error detection process is eliminated.

Next, correction candidate 3 will be considered. The correction candidate 3 is a correction proposal when the bit T26 is an error candidate to be corrected. The receiving amplitude level +2 (i.e., the error level value) is first referred to. With reference to the error correction table of FIG. 10, the correction level value corresponding to the error level value +2 is +1 or +3. An AMI state S of the bit T25 located previous to the bit T26 is "−." Accordingly, the multilevel code data "+1, −2, +3, −2, +1" with the amplitude level of the bit T26 being corrected to +3 is obtained as a correction proposal for the correction candidate 3. This correction proposal corresponds to the AMI states S "1−, 0−, 1+, 0+, 1−." This result shows that the code rule violation detected with the above-described error detection process is eliminated.

Next, correction candidate 4 will be considered. The correction candidate 4 is a correction proposal when the bit T27 is an error candidate to be corrected. The receiving amplitude level −2 (i.e., the error level value) is first referred to. With reference to the error correction table of FIG. 10, the correction level value corresponding to the error level value −2 is −1 or −3. An AMI state S of the bit T26 located previous to the bit T27 is "−." Accordingly, the multilevel code data "+1, −2, +2, −2, +1" with the amplitude level of the bit T27 being corrected to −1 is obtained as a correction proposal for the correction candidate 4. This correction proposal corresponds to the AMI states S "1−, 0−, 0−, 1+, 1−." This result shows that the code rule violation detected with the above-described error detection process is eliminated.

Next, correction candidate 5 will be considered. The correction candidate 5 is a correction proposal when the bit T28 is an error candidate to be corrected. The receiving amplitude level +1 (i.e., the error level value) is first referred to. With reference to the error correction table of FIG. 10, the correction level value corresponding to the error level value +1 is +2. Accordingly, the multilevel code data "+1, −2, +2, −2, +2" with the amplitude level of the bit T28 being corrected to +2 is obtained as a correction proposal for the correction candidate 5. This correction proposal corresponds to AMI state S "1−, 0−, 0−, 0−, 0−." This result shows that the code rule violation detected with the above-described error detection process is eliminated.

As described above, with the error correction table illustrated in FIG. 10, the correction candidate which can eliminate the code rule violation can be specified. If there is one correction candidate, the transmission error can be corrected with the correction candidate. If, however, there is a plurality of correction candidates as in the example illustrated in FIG. 9, it is necessary to select a suitable correction candidate. Next, a method for specifying a suitable correction candidate among a plurality of correction candidates will be described.

In many cases, the larger the difference in amplitude levels between adjacent two bits, the higher the rate of occurrence of the transmission error in the transmission path 202. For example, a transmission error occurs at a higher rate where successive amplitude levels are −1 and +1 than where successive amplitude levels are −3 and +3. The error correcting section 334 selects a bit having a larger amplitude level difference between adjacent bits as suitable correction candidate. In the example illustrated in FIG. 9, the amplitude level difference (hereinafter, referred to as the "level difference after correction") between adjacent bits corresponding to the correction candidate 1 is 2. Similarly, the level difference of the correction candidate 2 after correction is 2, the level difference of the correction candidate 3 after correction is 5, the level difference of the correction candidate 4 after correction is 3 and the level difference of the correction candidate 5 after correction is 4. Accordingly, the correction candidate 3 with the largest level difference after correction is selected as the suitable correction candidate.

In the example of FIG. 9, the correction candidate with the largest level difference after correction is narrowed down to one. Thus, a suitable correction candidate can be determined at this time. In some cases, however, there may be a plurality of correction candidates with the largest level difference after correction. In that case, in the present embodiment, the correction candidate with the largest absolute value of the amplitude level after correction is selected as the suitable correction candidate. In many cases, the larger the absolute value of the amplitude level, the higher the rate of occurrence of the transmission error. If there is a plurality of correction candidates with the largest level difference after correction, the error correcting section 334 determines the candidate having the largest absolute value of the amplitude level after correction as the suitable correction candidate.

In the example of FIG. 9, the correction candidate 3 in which the bit T26 is corrected is selected as a suitable correction candidate and "1−, 0−, 1+, 0+, 1−" is acquired as the suitable AMI state S. Thus, in the example of FIG. 9, the NRZ data "1, 0, 0, . . . , 1, 1, 1, 0, 1, 0, 1, 0, 1, 1, 1, 0, 1, 1" after error correction is output from the error correcting section 334 as the received data. In this manner, the received data after error correction is input into each component of the display module 300 from the second transmission interface 304.

The error correction process according to the present embodiment has been described. The error correction process according to the present embodiment includes the steps of specifying correction candidate(s) which can eliminate the code rule violation on the basis of the error correction table as illustrated in FIG. 10 and selecting a suitable correction candidate on the basis of the amplitude level difference and the absolute amplitude value from among the correction candidate(s).

Note that the error detection process and the error correction process described above are implemented under the following assumptions.

(1) In many cases, only random errors occur in the transmission path of relatively high transmission quality and thus it suffices to perform one bit error correction for each frame or each block.

(2) The larger the amplitude level difference between adjacent bits, the higher the rate of occurrence of the transmission error.

(3) The larger the absolute value of the amplitude level, the higher the rate of occurrence of the transmission error.

The error detection process and the error correction process may provide, under these assumptions, sufficient error correction ability without an increase in power consumption and circuit size when applied to a transmission environment of relatively high transmission quality.

Process Flow in Error Correction Process

Figure 11:
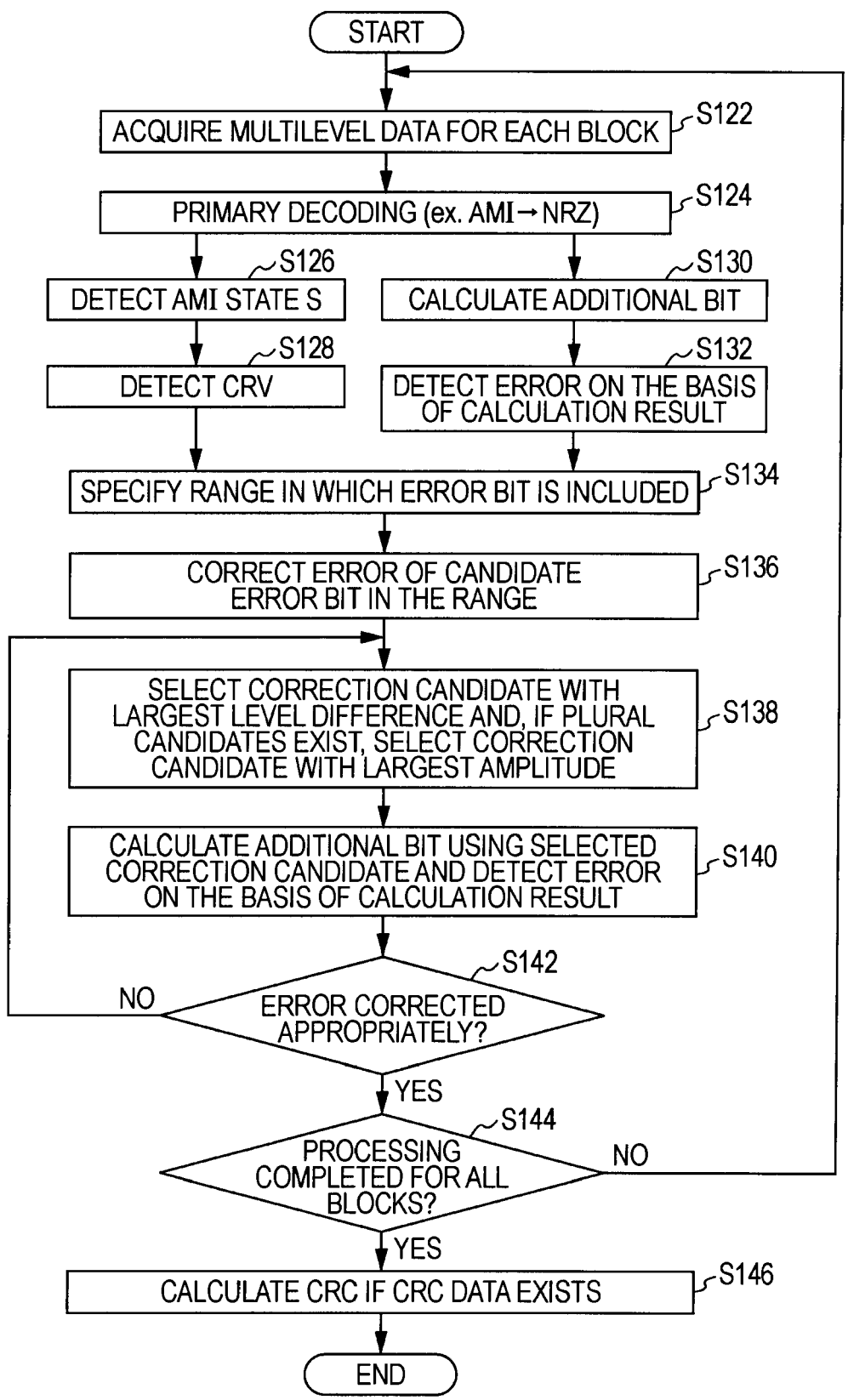
FIG. 11 illustrates a flow of an entire process executed at a receiver side including error correction process according to the embodiment.

With reference to FIG. 11, a process flow including the error correction process will be described briefly hereinbelow. FIG. 11 illustrates a process flow including the error correction process according to the present embodiment. The process illustrated in FIG. 11 is mainly implemented by a function of the error correcting section 334.

As illustrated in FIG. 11, the error correcting section 334 first acquires the multilevel code data for each block (S122). The error correcting section 334 then decodes the acquired multilevel code data and generates the NRZ data (S124). For example, if the multilevel code data is 6-value code data as illustrated in FIG. 8, the amplitude levels +3, +2, +1, −1, −2 and −3 correspond to the amplitude levels +1, 0, −1, +1, 0 and −1 of the AMI code waveform, respectively. Accordingly, the decoding process in step S124 substantially corresponds to a process to convert the AMI code data into the NRZ data.

Subsequently, the error correcting section 334 detects the AMI state S on the basis of the multilevel code data (S126). As described above, since the bit value of the multilevel code data and the amplitude level of the AMI code waveform correspond to each other, the AMI code state S can be obtained from the multilevel code data. The error correcting section 334 then detects the code rule violation from the detected AMI code state S (S128). With the AMI code rule, code rule violation of the AMI code rule can be detected by looking for a bit position where the AMI state S of the bit corresponding to the data 1 and the AMI state S of the previous bit have the same polarity.

The error correcting section 334 calculates an additional bit on the basis of the acquired NRZ data in step S124 (S130). For example, if the additional bit is added for each block, a bit value of the additional bit is calculated in step S130 on the basis of a predetermined calculation formula from a bit string of the block to which the additional bit is added. The error correcting section 334 then compares the bit value of the additional bit calculated in step S130 with a bit value represented by the additional bit and detects an error in the block for which the additional bit is to be calculated. If no error is included in the block, both the bit values should be the same.

Since the code rule violation is detected in step S128, a transmission error within the block can be detected at that time. However, if two successive error bits have occurred, the transmission error may not be detected by code rule violation. The error detection process using the additional bit executed in steps S130 and S132, however, can also detect the transmission error occurring in successive two bits. These error detection processes can cooperatively improve accuracy in error detection. The error detection process in steps S130 and S132 may also be omitted in accordance with acceptable circuit size, power consumption and guaranteed transmission quality.

After the above-described detection process is completed, the error correcting section 334 proceeds to step S134. In step S134, the error correcting section 334 specifies a range which includes the error bit (S134). The error correcting section 334 specifies the range which includes error bit on the basis of the code rule violation detected in step S128. The error correcting section 334 then performs predetermined error correction to each bit (i.e., each candidate error bit) within the specified range (S136). The error correcting section 334 performs error correction to each bit on the basis of the error correction table shown in FIG. 10 and generates a bit string used as a correction candidate.

The error correcting section 334 then compares the amplitude level of the corrected error bit with the amplitude level of a previous adjacent bit of the error bit and calculates the amplitude level difference. The error correcting section 334 also compares the amplitude level differences calculated for each correction candidate and selects a correction candidate with the largest amplitude level difference. If there is a plurality of correction candidates with the largest amplitude level difference, the error correcting section 334 selects, from among these correction candidates, a correction candidate with the largest absolute value of the amplitude level after correction (S138). The error correcting section 334 then calculates an additional bit from the bit string of the selected correction candidate and determines whether or not the error has been corrected suitably on the basis of the calculation result (S140 and S142).

That is, the error correcting section 334 determines whether or not the bit value of the additional bit calculated from the bit string of the correction candidate and the bit value added to the bit string are the same to each other. When these values of the additional bits are the same to each other, the error correcting section 334 proceeds to step S144. When, on the other hand, these values of the additional bits are not the same to each other, the error correcting section 334 loops back to step S138. When the process loops back to step S138, the error correcting section 334 selects a correction candidate with the largest amplitude level difference from among other correction candidates except for the correction candidate previously selected in step S138. If necessary, the error correcting section 334 selects the correction candidate with the largest absolute value of the amplitude level. Processes in steps S140 and S142 are as described above.

When the process proceeds to step S144, the error correcting section 334 determines whether or not the error correction process is completed for all the blocks. If not completed, the series of process beginning in step S122 is repeated until the error correction process is completed for all the blocks. When the error correction process is completed for all the blocks, the error correcting section 334 proceeds to step S146. In step S146, the error correcting section 334 confirms whether or not CRC data is included in a reception frame and, if the CRC data is included, executes CRC calculation (S146). The error correcting section 334 then completes a series of process relating to the error correction.

The signal processing method according to the present embodiment has been described. As described above, the signal processing method according to the present embodiment specifies a range in which an error bit is included on the basis of code rule violation detected from received signals and performs one bit error correction with respect to that range. The above-described method may provide sufficient error correction ability without an increase in power consumption and circuit size when applied to a transmission environment of relatively high transmission quality.

1-5. Exemplary Usage of Additional Bits

In the signal transmission method described above, the additional bit is used to determine whether the error correction has been completed suitably or not. The additional bit is calculated on the basis of a predetermined computation rule from a bit value of a bit string (for example, one block) to which the additional bit is to be added. If any error is included in the bit string, the bit value of the additional bit calculated from the bit string should differ from the bit value of the additional bit added to the bit string. In the error correction process described above, it is determined whether the error correction has been performed suitably using such character of the bit value.

Figure 12:
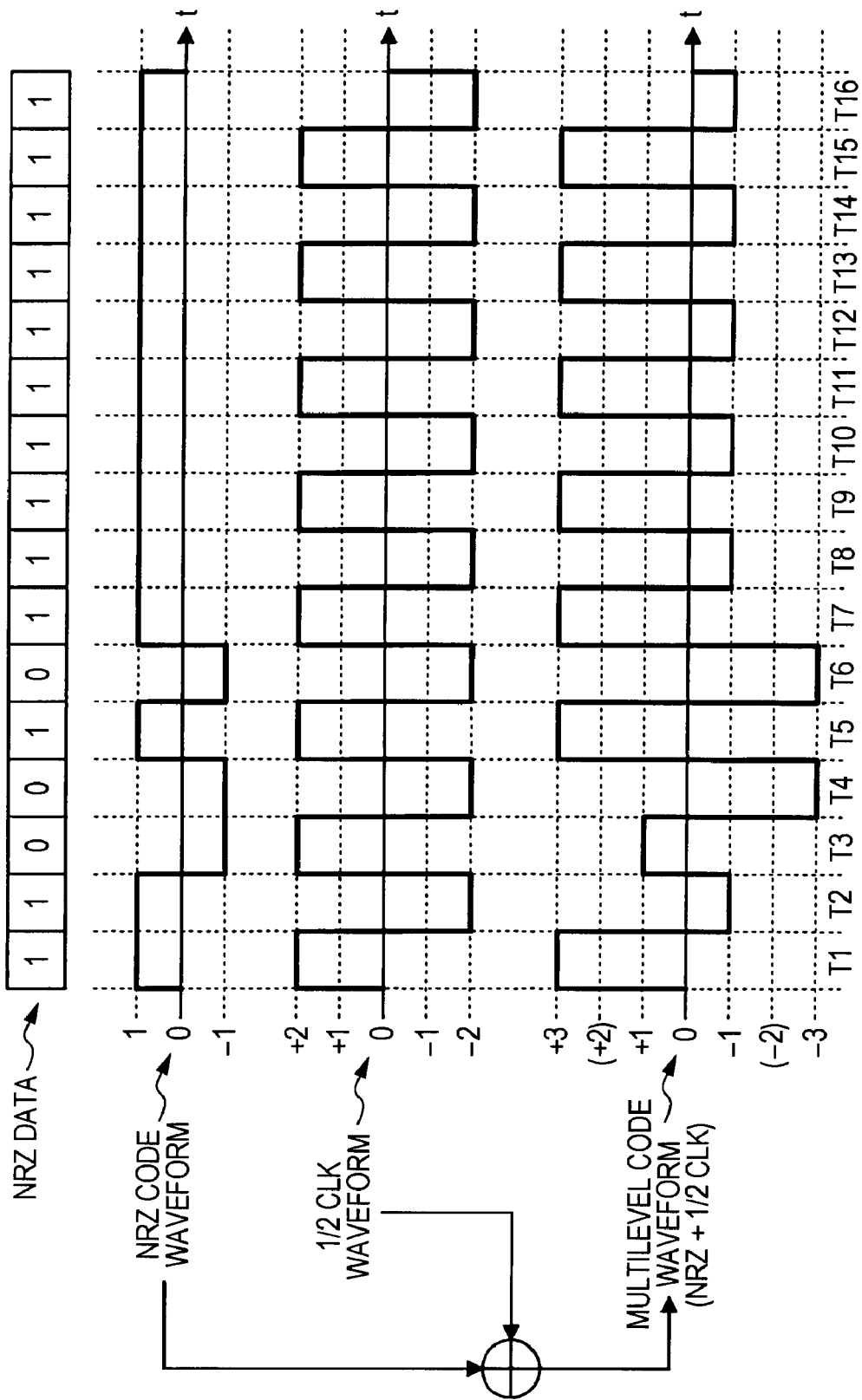
FIG. 12 illustrates a method for generating another multi-level code which can be used for inter-module data transmission in the information processing device according to the embodiment.

The computation rule for calculating the bit value of the additional bit may be decided arbitrarily to a certain extent. A method for effectively using the additional bit will be proposed hereinbelow. The utilizing method proposed herein is a method for using the additional bit for correction of DC offset. First, DC offset will be described. Here, DC offset of the multilevel code waveform (see FIG. 12) generated by averaging the NRZ code waveform synchronously by clock (½CLK waveform) will be described. The multilevel code waveform illustrated in FIG. 12 is a signal waveform of 4-value code data acquired by averaging the NRZ code waveform represented by the amplitude levels of +1 and −1 synchronously by clock of the amplitude levels of +2 and −2. The amplitude level of the multilevel code waveform can take 4 values of +3, +1, −1 and −3. The DC offset of the multilevel code waveform is illustrated in FIG. 13.

Figure 13:
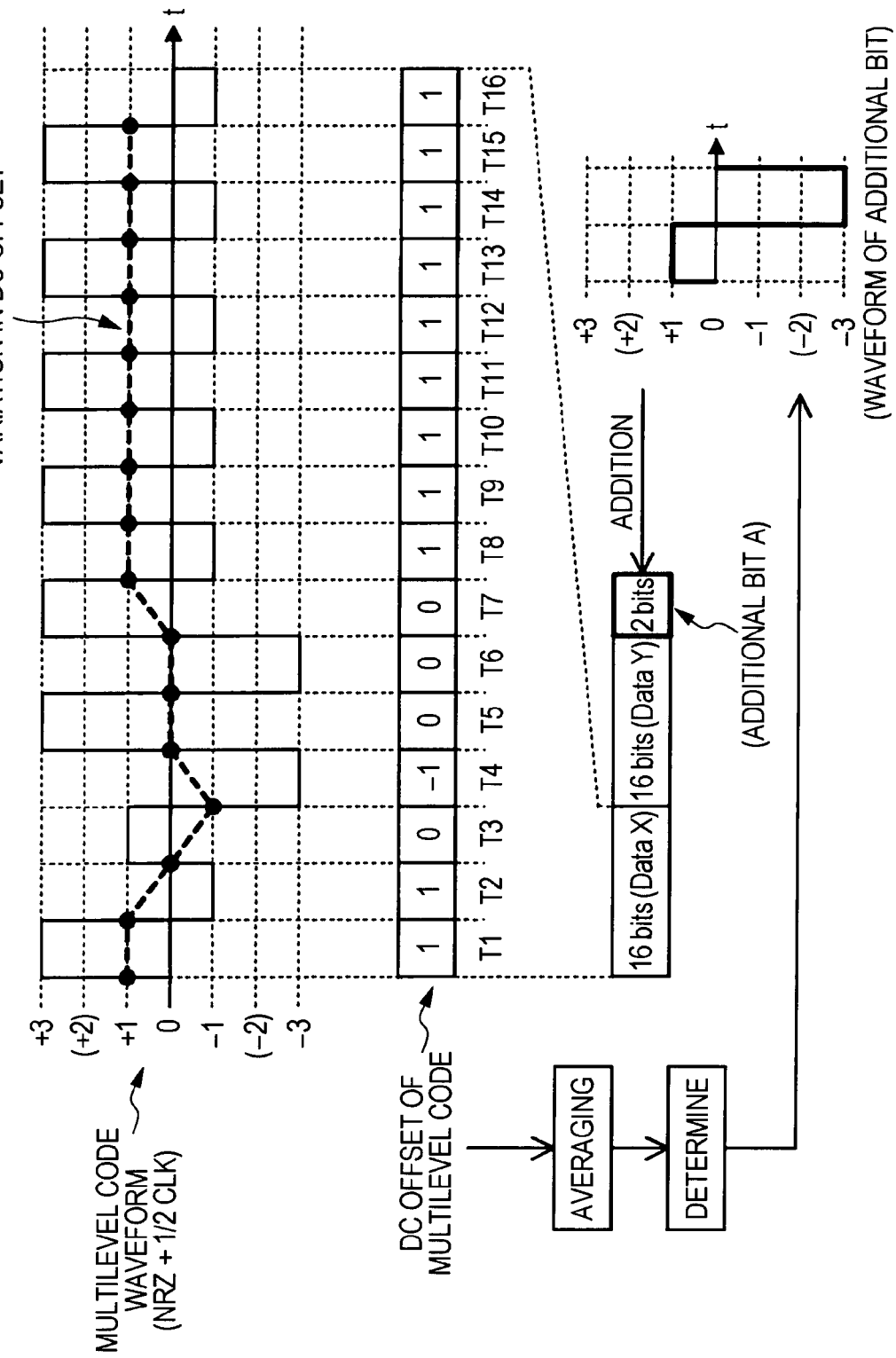
FIG. 13 illustrates a method for generating additional bits which can be used in the error correction process according to the embodiment.

FIG. 13 illustrates a multilevel code waveform based on the NRZ code waveform and variation in the DC offset corresponding to each bit position. The DC offset corresponding to each bit position herein means a mean amplitude level of adjacent bits. For example, a DC offset value 0 correlated with the bit T3 is an average value (0=(−1+1)/2) of the amplitude levels (−1, +1) of the bits T2 and T3. Similarly, the DC offset value −1 correlated with the bit T4 is an average value (−1=(+1−3)/2) of the amplitude levels (+1, −3) of the bits T3 and T4.

In the example illustrated in FIG. 13, averaging=$^{10}/_{16}$>0 is obtained through averaging of the DC offset for the bit string (T1 to T16) corresponding to Data X. That is, DC balance is biased toward the positive direction. Averaging of the DC offset for the entire Data X and Data Y may also be calculated similarly. When the DC balance is biased, the transmission error may occur easily when the transmission signal of the multilevel code data is transmitted in a superimposed manner with the signals which have a DC component.

For example, when direct current power signals are transmitted in a superimposed manner with transmission signals of the multilevel code data, the receiver side performs DC cut-off and reproduces multilevel code data. At this time, the DC component included in the multilevel code waveform may be cut off, which may make it difficult to reproduce appropriate multilevel code data. It is therefore preferred to correct the DC balance so that averaging of the DC offset may approximately close to 0. In the present embodiment, the bit value of the additional bit is set up in the following manner in accordance with averaging of the DC offset. The setup process is implemented by a function of the signal transmitting section 112.

The signal transmitting section 112 first calculates averaging of DC offset regarding the bit string (in the example of FIG. 13, the entire Data X and Data Y) to which the additional bit is added. Subsequently, the signal transmitting section 112 determines whether the averaging of the DC offset is positive, 0 or negative. If the averaging of the DC offset is positive, the signal transmitting section 112 sets the amplitude level of the additional bit to +1, −3. In the multilevel code waveform illustrated in FIG. 13, the NRZ code waveform corresponding to the additional bit is −1, −1 (NRZ data is 0, 0).

If the averaging of the DC offset is 0, the signal transmitting section 112 sets the amplitude level of the additional bit to +1, −1. In the multilevel code waveform illustrated in FIG. 13, the NRZ code waveform corresponding to the additional bit is −1, +1 (NRZ data is 0, 1). If the averaging of the DC offset is negative, the signal transmitting section 112 sets the amplitude level of the additional bit to +3, −1. In the multilevel code waveform illustrated in FIG. 13, the NRZ code waveform corresponding to the additional bit is +1, +1 (NRZ data is 1, 1). With the thus-set computation rule of the additional bit, the DC balance of the multilevel code waveform is corrected and transmission characteristic is improved.

2. Conclusion

Finally, technical content relating to the above-described embodiment and its effects will be summarized briefly. As described above, effectiveness of the technique of the embodiment is enhanced when the embodiment is applied to a transmission environment like a cable transmission path incorporated in an apparatus with a relatively low transmission error rate. In such a transmission path, the transmission error occurring in a short frame or a block is at most about one bit long. The technique of the embodiment performs one bit error correction utilizing such characteristics of the transmission path. With the technique of the embodiment, the error bit occurring in the transmission path may be corrected effectively without a significant increase in circuit size.

The technique relating to the embodiment is used suitably for short-distance wiring incorporated in apparatuses. For example, the technique is used for signal transmission on a transmission line wired in a hinge section of a mobile device. It is necessary for mobile devices to be compact and low in power consumption. It is therefore necessary to provide a substantially effective error correction process with no increase in the circuit size. If there are no restrictions on the circuit size, further signal processing may be performed after the error correction relating to the embodiment is completed so as to increase accuracy in error correction. Sufficient effects can be provided, however, by the error correction according to the present embodiment when considering the purposes and application of the embodiment.

In the foregoing, the error correction process according to the present embodiment has been applied to the multilevel code data based on the AMI code. However, the error correction process according to the embodiment may also be applied to multilevel code data based on other codes. For example, the error correction process according to the present embodiment may also be applied to 4-value multivalued signals in which clock is superimposed on a code mark inversion (CMI) code or a Manchester code. In these modified embodiments, rule violation regarding state transition of these other code rules is detected in an error detection step and a range in which an error bit is included is specified on the basis of the state transition. Error correction is performed to each bit within the specified range in an error correction step. Then, the most possible error bit candidate is selected on the basis of variation in the amplitude level and error correction is performed. If CRC data is included in the frame, it is determined by CRC calculation whether or not the error correction has been performed suitably. With this configuration, the technique of the present embodiment may also be applied to other code rules.

Remarks

The second transmission interface 304 is an exemplary signal processor. The signal receiving section 312, the comparator 314 and the synchronization detecting section 332 are exemplary signal receiving sections. The error correcting section 334 is an exemplary rule violation detecting section, error range specifying section and error correcting section. The error correcting section 334 is an exemplary correction value determination section, amplitude difference calculating section, maximum difference selecting section, correction processing section, absolute value calculating section and maximum absolute value selecting section. The error correcting section 334 is an exemplary first error detecting section and second error detecting section.

The exemplary configuration of the rule violation detecting section has been described in detail with reference to FIG. 8. Exemplary configurations of the error range specifying section and the error correcting section (i.e., the correction value determination section, the amplitude difference calculating section, the maximum difference selecting section, the correction processing section, the absolute value calculating section and the maximum absolute value selecting section) have been described in detail with reference to FIGS. 9 and 10. Exemplary configurations of the first error detecting section and the second error detecting section have been described in detail with reference to FIG. 11. An exemplary configuration in which an additional bit is used for DC offset correction has been described in detail with reference to FIG. 13. An exemplary coding scheme of signals received in the signal receiving section has been described in detail with reference to FIG. 7.

While a preferred embodiment of the invention has been described in detail with reference to the accompanying drawings, such description is for illustrative purposes only and it will be obvious to those of ordinary skill in the art that various changes and modifications may be made without departing from the spirit and scope of the appended claims. These changes and modifications should be considered to be within the scope of the invention.

In the foregoing, for example, it is determined whether or not the error correction has been performed suitably with respect to the selected correction candidate and, if the determination result is negative, another correction candidate is reselected. Alternatively, the series of process may be completed without reselecting another correction candidate in accordance with acceptable processing time and circuit size. As described above, the present embodiment is intended to be applied to a transmission path of relatively high transmission quality. The number error bits included in one frame is small. Thus, sufficient effects can be provided by correcting only some of the error bits. Another approach to allow a certain amount of error bits may include shifting to error correction of next block when, for example, no correction candidate passes inspection of the additional bit. The configuration may be modified so as to satisfy the demands on devices in which the present embodiment is incorporated.

The present application contains subject matter related to that disclosed in Japanese Priority Patent Application JP 2009-109625 filed in the Japan Patent Office on Apr. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processor, comprising:
a signal receiving section for receiving signals encoded under a predetermined code rule;
a rule violation detecting section for detecting code rule violation included in the signals received by the signal receiving section;
an error range specifying section for specifying a range in which an error bit is included out of a bit string which constitutes the signals on the basis of a position of the code rule violation detected by the rule violation detecting section; and
an error correcting section for correcting one error bit in the range specified by the error range specifying section so that the code rule violation detected by the rule violation detecting section is eliminated,
wherein the error correcting section includes:
a correction value determination section for determining a value of a correction bit which can eliminate the code rule violation detected by the rule violation detecting section for each bit in the range specified by the error range specifying section;
an amplitude difference calculating section for calculating difference between an amplitude value of the signals corresponding to a value of the correction bit determined by the correction value determination section and an amplitude value of the signals corresponding to a previous bit of the correction bit;
a maximum difference selecting section for comparing difference in the amplitude values corresponding to each of the bits in the range calculated by the amplitude difference calculating section and selecting a value of a correction bit with the maximum difference in the amplitude value; and
a correction processing section for correcting an error using a value of the correction bit selected by the maximum difference selecting section, and
wherein at least one of the signal receiving section, the rule violation detecting section, the error range specifying section, and the error correcting section is a hardware section.

2. The signal processor according to claim 1, in which the error correcting section further includes:
an absolute value calculating section for calculating an absolute value of the value of the correction bit if there is a plurality of values of the correction bits selected by the maximum value selecting section; and
a maximum absolute value selecting section for comparing the absolute values of the values of the correction bits calculated by the absolute value calculating section and selecting a value of the correction bit with the largest absolute value,
wherein the correction processing section corrects an error using the value of the correction bit selected by the maximum absolute value selecting section if there is a plurality of values of the correction bits selected by the maximum value selecting section.

3. The signal processor according to claim 2, further comprising a first error detecting section for detecting an error in the bit string after correction by the correction processing section using an additional bit which is calculated on the basis of information about the bit string which constitutes the signal and is added to the bit string.

4. The signal processor according to claim 3, wherein if an error is detected by the error detection executed by the first error detecting section, the correction processing section corrects the error using a value of the correction bit selected by the maximum difference selecting section or the maximum absolute value selecting section out of the values of the correction bits determined by the correction value determination section except for the value of the correction bit in which the error has been detected.

5. The signal processor according to claim 4, further comprising a second error detecting section for detecting, if a cyclic redundancy check code is given to the bit string which constitutes the signals, an error using the cyclic redundancy check code with respect to the bit string after correction by the error correcting section.

6. The signal processor according to claim 5, wherein, if an error is detected by the error detection executed by the second error detecting section, the correction processing section corrects the error using a value of the correction bit selected by the maximum difference selecting section or the maximum absolute value selecting section out of the values of the correction bits determined by the correction value determination section except for the value of the correction bit in which the error has been detected.

7. The signal processor according to claim 1, wherein:
if a transmission frame which constitutes the signal is divided into a plurality of blocks,
the rule violation detecting section detects code rule violation for each block;
the error range specifying section specifies a range in which an error bit is included for each block; and
the error correcting section corrects one bit in the range specified by the error range specifying section for each block.

8. The signal processor according to claim 7, further comprising a first error detecting section for detecting an error in the bit string after correction by the correction processing section for each block using an additional bit calculated on the basis of information about the bit string which constitutes each block and is added to the bit string.

9. The signal processor according to claim 3, wherein the additional bit is calculated on the basis of information about the bit string so that DC offset is approximately close to 0 on the average in the entire transmission frame which constitutes the signals.

10. The signal processor according to claim 1, wherein the signal receiving section receives signals which have a multi-level code waveform representing one bit value as a plurality of amplitude values.

11. The signal processor according to claim 10, wherein the signal receiving section receives signals which have a multi-level code waveform obtained by averaging a signal waveform of a bipolar code synchronously by clock which has a ½ frequency of that of the bipolar code.

12. An error correction process, comprising the steps of:
receiving signals encoded under a predetermined code rule;
detecting code rule violation included in the signals received in the step of receiving signals;
specifying a range in which an error bit is included out of a bit string which constitutes the signals on the basis of a position of code rule violation detected in the step of detecting rule violation; and
correcting one error bit in the range specified in the step of specifying a range so that code rule violation detected in the step of detecting code rule violation is eliminated, wherein the step of correcting one error bit comprises:
determining a value of a correction bit which can eliminate the code rule violation detected by the step of detecting code rule violation for each bit in the range specified by the step of specifying a range;
calculating a difference between an amplitude value of the signals corresponding to a value of the correction bit determined by the step of determining a value of a correction bit and an amplitude value of the signals corresponding to a previous bit of the correction bit;
comparing the difference in the amplitude values corresponding to each of the bits in the range calculated by the step of calculating a difference, and selecting a value of a correction bit with the maximum difference in the amplitude value; and
correcting an error using a value of the correction bit selected by the step of selecting a value of a correction bit.

* * * * *